United States Patent [19]
Hosoya et al.

[11] Patent Number: 5,539,868
[45] Date of Patent: Jul. 23, 1996

[54] CHARACTER AND FIGURE TRANSFERRING SYSTEM

[75] Inventors: Rituko Hosoya, Kamakura; Tsukasa Yamauchi, Yokohama; Yasumasa Matsuda, Tokyo, all of Japan

[73] Assignee: Hitachi, Ltd., Tokyo, Japan

[21] Appl. No.: 539,725

[22] Filed: Oct. 5, 1995

Related U.S. Application Data

[63] Continuation of Ser. No. 931,199, Aug. 17, 1992, abandoned.

[30] Foreign Application Priority Data

Nov. 7, 1991 [JP] Japan .................. 3-291734

[51] Int. Cl.⁶ ........................... G06F 15/00
[52] U.S. Cl. ......................... 395/151; 395/141
[58] Field of Search ..................... 395/125, 127, 395/130, 150, 151, 140–143

[56] References Cited

U.S. PATENT DOCUMENTS

| | | | |
|---|---|---|---|
| 4,791,581 | 12/1988 | Ohba | 395/125 |
| 4,855,934 | 8/1989 | Robinson | 395/125 |
| 4,888,713 | 12/1989 | Falk | 395/125 |
| 4,935,879 | 6/1990 | Ueda | 395/125 |
| 5,255,352 | 10/1993 | Falk | 395/127 |
| 5,268,998 | 12/1993 | Simpson | 395/127 |
| 5,276,790 | 1/1994 | Lo et al. | 395/150 |
| 5,301,267 | 4/1994 | Hassett et al. | 395/151 |
| 5,309,554 | 5/1994 | Ito | 395/151 |
| 5,325,479 | 6/1994 | Kaasila | 395/151 |

FOREIGN PATENT DOCUMENTS 2-296292  12/1990  Japan .

OTHER PUBLICATIONS

"Letterform distortion on the Macintosh", *The Seybold Report on Desktop Publishing*, vol. 4, No.6, p.1(1), Feb. 5, 1990.

Edwards, "Letterform distortion on the Mac: TypeStyler, LetraStudio, SmartArt, TypeAlign,"*The Seybold Report on Desktop Publishing*, vol.4, No. 6, p. 3(21), Feb 5, 1990.

Edwards, "TypeStyler : designer's tool",*The Seybold Report on Desktop Publishing*, vol.4, No. 6, p. 5(7), Feb. 2, 1990.

Edwards, "LetraStudio : Freeform designer, " *The Seybold Report on Desktop Publishing*, vol. 4, No. 6, p. 12(5), Feb. 5, 1990.

Edwards, "SmartArt: handy desk accessory", *The Seybold Report on Desktop Publishing*, vol.4, No.6, p. 16(4), Feb. 5, 1990.

Edwards, "TypeAlign fits text to curves", *The Seybold Report on Desktop Publishing*, vol. 4, No. 6, p. 19(4), Feb. 5, 1990.

*Primary Examiner*—Heather R. Herndon
*Assistant Examiner*—Joseph R. Burwell
*Attorney, Agent, or Firm*—Fay,Sharpe,Beall,Fagan,Minnich & McKee

[57] ABSTRACT

A character and pattern transformation processing system comprises a display unit for displaying characters or patterns according to a pattern data in dot form, a device for transforming an outline data in vector form into a pattern data in dot form, a device for designating characters or patterns to be transformed in accordance with an external instruction, a device for setting a transformation region containing an object of transformation, a device for designating a transformed shape, and a device for subjecting an outline data of characters or patterns to be transformed to a transformational operation. An outline data of characters or patterns subjected to a transformational operation is transformed into a pattern data by the transformer and displayed on the display unit.

24 Claims, 39 Drawing Sheets

| | | |
|---|---|---|
| CODE DATA | CAPITAL LETTER B | |
| | START OF CLOSED CURVE | |
| COORDINATE DATA | (0.15, 0.85) | ← POINT 1 |
| | (0.15, 0.87) | ← POINT 2 |
| | (0.62, 0.87) | ← POINT 3 |
| CODE DATA | CURVE | |
| COORDINATE DATA | (0.8, 0.8) | ← POINT 4 (CURVE CONTROL UNIT) |
| | (0.8, 0.63) | ← POINT 5 (CURVE CONTROL UNIT) |
| | (0.63, 0.52) | ← POINT 6 (CURVE CONTROL UNIT) |
| | (0.82, 0.49) | ← POINT 7 |
| | ⋮ | ⋮ |
| | (0.15, 0.85) | ← POINT 1 |
| | (0.37, 0.82) | ← POINT 14 |
| | ⋮ | ⋮ |
| | (0.37, 0.52) | |
| | DATA END | |

F I G. 4

| PATTERN CODE | SIZE | DISPLAY POSITION | DEFORMATION |
|---|---|---|---|
| CAPITAL LETTER T | (10, 10) | (20, 30) | 0 |
| CAPITAL LETTER E | (10, 10) | (30, 30) | 0 |
| CAPITAL LETTER S | (10, 10) | (40, 30) | 0 |
| CAPITAL LETTER T | (10, 10) | (50, 30) | 0 |
| ⋮ | ⋮ | ⋮ | ⋮ |

FIG. 6

| | TRANSFORMATION 1 | TRANSFORMATION 2 | TRANSFORMATION 3 | TRANSFORMATION 4 | TRANSFORMATION 5 | TRANSFORMATION 6 | TRANSFORMATION 7 | TRANSFORMATION 8 | TRANSFORMATION 9 |
|---|---|---|---|---|---|---|---|---|---|
| a | 1.25 | 1.0 | 1.0 | 1.0 | 1.0 | 1.25 | 1.0 | 0.5 | 1.0 |
| b | -0.9 | 0.0 | 0.0 | 0.0 | 0.0 | -0.5 | 0.0 | 0.0 | 0.0 |
| c | 0.45 | 0.0 | 0.0 | 0.0 | 0.0 | 0.25 | 0.0 | 0.0 | 0.0 |
| d | 0.0 | 0.0 | 2.5 | 0.0 | 0.5 | 0.0 | 0.0 | 0.0 | 0.0 |
| e | 0.0 | 0.0 | -2.5 | 0.0 | -1.0 | 0.0 | 0.0 | 0.0 | 1.0 |
| f | 1.0 | 1.0 | 3.0 | 1.0 | 2.0 | 1.0 | 1.0 | 2.0 | 1.0 |
| p | 0.0 | -0.75 | 0.9 | 0.0 | 0.0 | 0.0 | 0.0 | 0.0 | 0.0 |
| p0 | 0.0 | 0.0 | 0.0 | 0.0 | 0.0 | 0.0 | 0.0 | 0.0 | 0.0 |
| q | 0.75 | -0.75 | 0.0 | 0.0 | 0.0 | 0.0 | 0.0 | 0.0 | 0.0 |
| q0 | 0.0 | 0.0 | 0.0 | 0.0 | 0.0 | 0.0 | 0.0 | 0.0 | 0.0 |
| sa | 1.0 | 1.0 | 1.0 | 1.0 | 1.0 | 1.0 | 1.0 | 0.0 | 1.0 |
| sb | 0.0 | 0.0 | 0.0 | 0.0 | 0.0 | 0.0 | 0.0 | $\sqrt{2}$ | 0.0 |
| sc | 0.0 | 0.0 | 0.0 | 0.0 | 0.0 | 0.0 | 0.0 | $\sqrt{2}/2$ | 0.0 |
| sd | 0.0 | 0.0 | 0.0 | 0.0 | 0.0 | 0.0 | 0.0 | $\pi/2$ | 0.0 |
| se | 0.0 | 0.0 | 0.0 | 0.0 | 0.0 | 0.0 | 0.0 | $\pi/4$ | 0.0 |
| sf | 0.0 | 0.0 | 0.0 | 0.0 | 0.0 | 0.0 | 0.0 | 0.5 | 0.0 |
| ta | 1.0 | 1.0 | 2.0 | 1.0 | 1.0 | 1.0 | 1.0 | 0.0 | 1.0 |
| tb | 0.0 | 0.0 | $-\sqrt{2}$ | 1.5 | 0.0 | 0.0 | 0.0 | $\sqrt{2}$ | 0.5 |
| tc | 0.0 | 0.0 | $\sqrt{2}$ | -0.75 | -0.25 | -1.0 | 0.5 | $-\sqrt{2}/2$ | 0.0 |
| td | 0.0 | 0.0 | $\pi/2$ | $\pi$ | $2\pi$ | $\pi$ | $3\pi$ | $\pi/2$ | $2\pi$ |
| te | 0.0 | 0.0 | $\pi/4$ | 0.0 | 0.0 | 0.0 | 0.0 | $\pi/4$ | 0.0 |
| tf | 0.0 | 0.0 | -1.0 | 0.0 | 0.0 | 0.0 | 0.0 | 0.5 | 0.0 |

FIG. 9
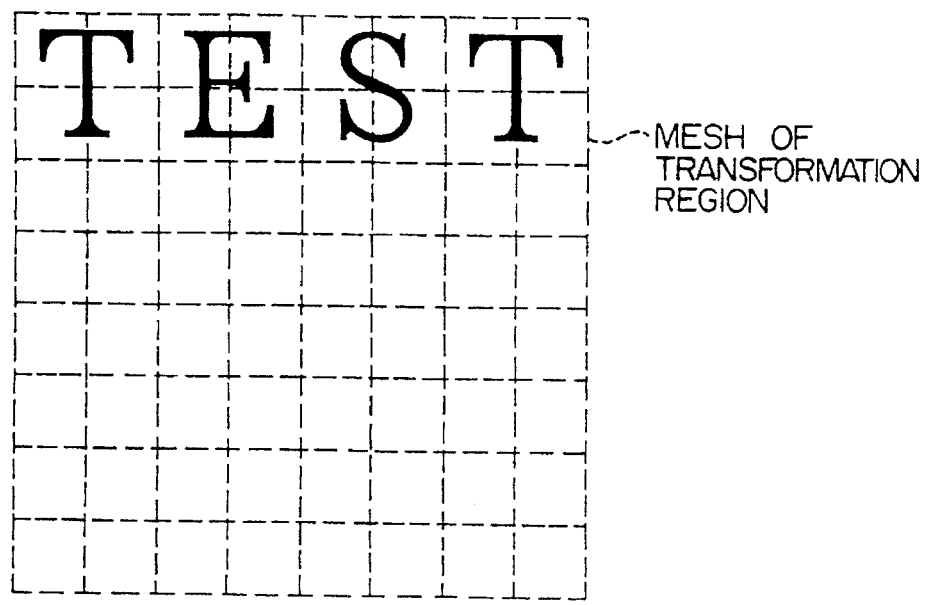
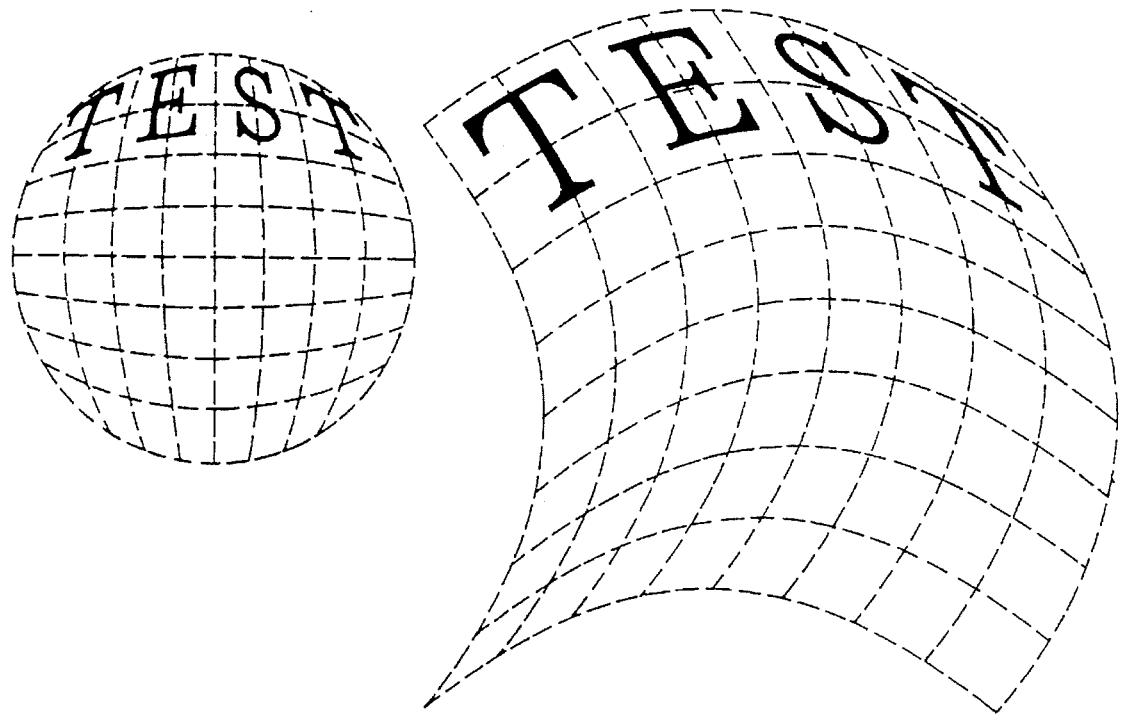

FIG. 14

$$\begin{cases} X'' = pp \cdot \left( \dfrac{X-p0}{1+p \cdot |(X-p0)|} + \dfrac{p0}{1+p \cdot p0} \right) \\ \quad \text{WHERE} \quad pp = \dfrac{(1+p \cdot p0) \cdot \{1+p \cdot (1-p0)\}}{1+2 \cdot p \cdot p0 \cdot (1-p0)} \\ Y'' = qq \cdot \left( \dfrac{Y-q0}{1+q \cdot |(Y-q0)|} + \dfrac{q0}{1+q \cdot q0} \right) \\ \quad \text{WHERE} \quad qq = \dfrac{(1+q \cdot q0) \cdot \{1+q \cdot (1-q0)\}}{1+2 \cdot q \cdot q0 \cdot (1-q0)} \end{cases}$$ --- EQUATION ①

$$\begin{cases} X'' = sa \cdot X + (sb \cdot X + sc) \cdot \sin(sd \cdot Y + se) + sf \\ Y'' = ta \cdot Y + (tb \cdot Y + tc) \cdot \sin(td \cdot X + te) + tf \end{cases}$$ --- EQUATION ②

$$\begin{cases} X'' = a \cdot X + b \cdot X \cdot Y + c \cdot Y \\ Y'' = d \cdot X + e \cdot X \cdot Y + f \cdot Y \end{cases}$$ --- EQUATION ③

$$\begin{cases} a1 = \dfrac{4}{3} \cdot X2 + \dfrac{1}{12} \cdot X1 - \dfrac{5}{12} \cdot X3 \\ b1 = \dfrac{4}{3} \cdot Y2 + \dfrac{1}{12} \cdot Y1 - \dfrac{5}{12} \cdot Y3 \end{cases}$$ --- EQUATION ④

$$\begin{cases} a2 = \dfrac{4}{3} \cdot X2 - \dfrac{5}{12} \cdot X1 + \dfrac{1}{12} \cdot X3 \\ b2 = \dfrac{4}{3} \cdot Y2 - \dfrac{5}{12} \cdot Y1 + \dfrac{1}{12} \cdot Y3 \end{cases}$$ --- EQUATION ⑤

$$\begin{cases} X'' = (2 \cdot x - 1) \sqrt{\dfrac{1}{2} - (y - \dfrac{1}{2})} + \dfrac{1}{2} \\ Y'' = (2 \cdot y - 1) \sqrt{\dfrac{1}{2} - (x - \dfrac{1}{2})} + \dfrac{1}{2} \end{cases}$$ --- EQUATION ⑥

FIG. 18
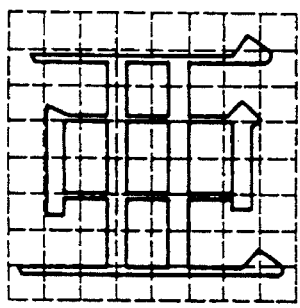
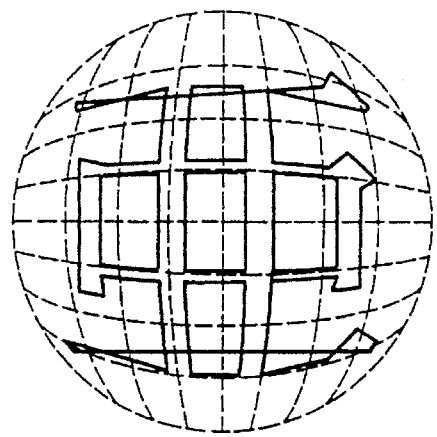
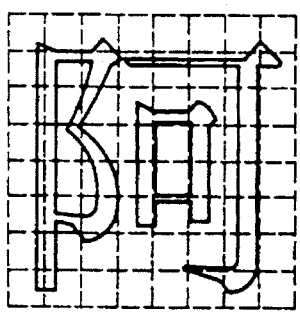
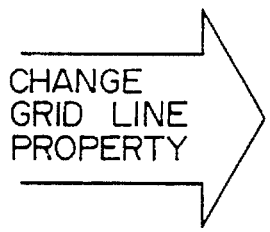
CHANGE GRID LINE PROPERTY
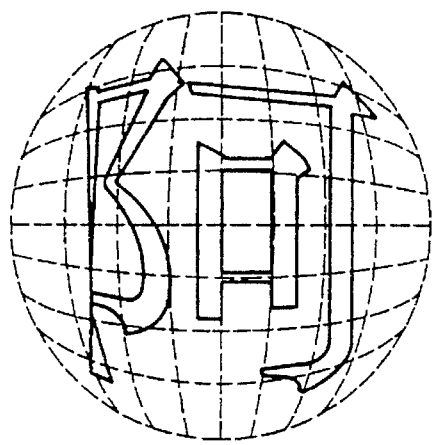
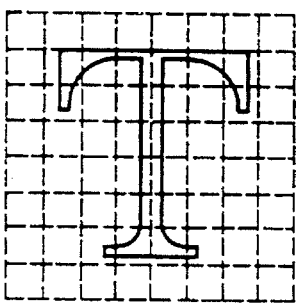
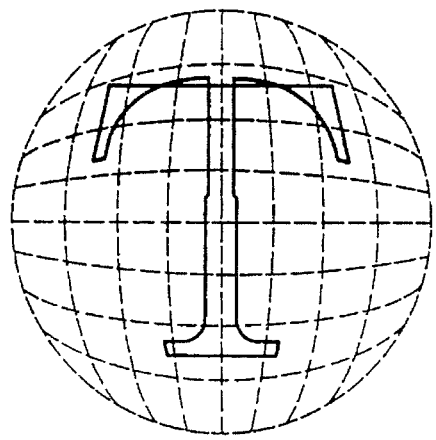

FIG. 19A
FIG. 19B
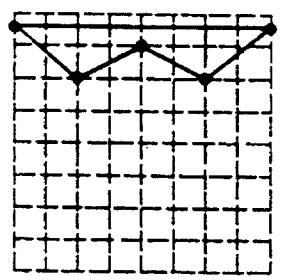
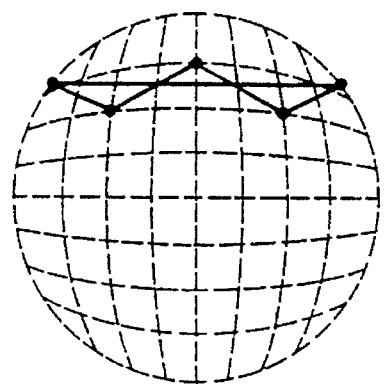
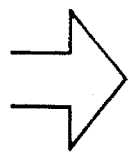
| PATTERN 32 |
|---|
| START OF CLOSED CURVE |
| (0.00, 0.95) |
| (0.25, 0.75) |
| (0.50, 0.88) |
| (0.75, 0.75) |
| (1.00, 0.95) |
| (0.00, 0.95) |
| DATA END |
| PATTERN 32 |
|---|
| START OF CLOSED CURVE |
| (-0.04, 0.95) |
| (0.17, 0.83) |
| (0.50, 1.04) |
| (0.83, 0.83) |
| (1.04, 0.95) |
| (-0.04, 0.95) |
| DATA END |

| PATTERN 32 |
|---|
| START OF CLOSED CURVE |
| (-0.04, 0.95) |
| (0.05, 0.91) |
| (0.17, 0.83) |
| (0.34, 0.94) |
| (0.50, 1.04) |
| (0.66, 0.94) |
| (0.83, 0.83) |
| (0.95, 0.91) |
| (1.04, 0.95) |
| (0.90, 1.03) |
| (0.77, 1.09) |
| (0.63, 1.12) |
| (0.50, 1.14) |
| (0.37, 1.12) |
| (0.23, 1.09) |
| (0.10, 1.03) |
| (-0.04, 0.95) |
| DATA END |

) COORDINATE OF DIVIDING POINT (rows 2-3)

) COORDINATE OF DIVIDING POINT (row 4)

) COORDINATE OF DIVIDING POINT (row 6)

) COORDINATE OF DIVIDING POINT (row 8)

} COORDINATE OF DIVIDING POINT (rows 10-16)

CONFIGULATION OF INTERPOLATION LINE CORRECTING SECTION

| PATTERN 32 | |
|---|---|
| START OF CLOSED CURVE | |
| (-0.04, 0.95) | |
| CURVE | ) CURVE CODE |
| (-0.01, 0.95) | ⎫ |
| (0.09, 0.89) | ⎬ CURVE CONTROL POINT |
| (0.17, 0.83) | ⎭ |
| CURVE | ) CURVE CODE |
| (0.27, 0.89) | ⎫ |
| (0.42, 0.99) | ⎬ CURVE CONTROL POINT |
| (0.50, 1.04) | ⎭ |
| CURVE | ) CURVE CODE |
| (0.57, 0.99) | ⎫ |
| (0.73, 0.89) | ⎬ CURVE CONTROL POINT |
| (0.83, 0.83) | ⎭ |
| CURVE | ) CURVE CODE |
| (0.90, 0.89) | ⎫ |
| (1.01, 0.95) | ⎬ CURVE CONTROL POINT |
| (1.04, 0.95) | ⎭ |
| CURVE | ) CURVE CODE |
| (0.77, 1.20) | ⎫ |
| (0.23, 1.20) | ⎬ CURVE CONTROL POINT |
| (-0.04, 0.95) | ⎭ |
| DATA END | |

FIG. 24A
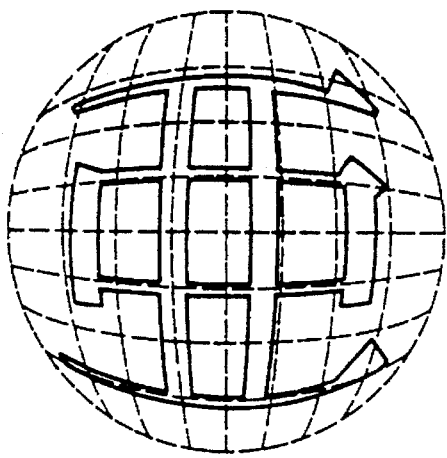
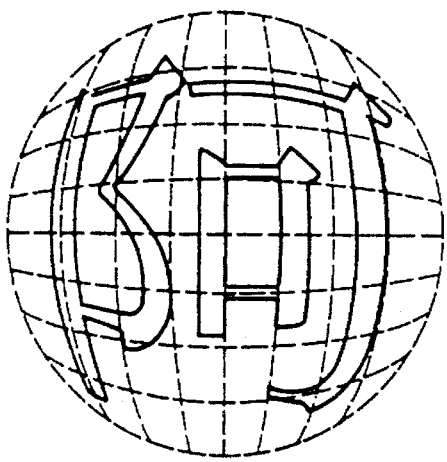
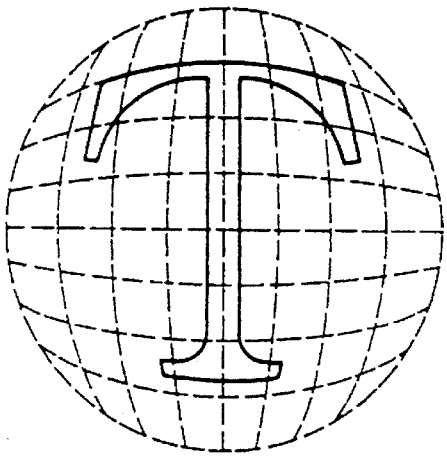
FIG. 24B
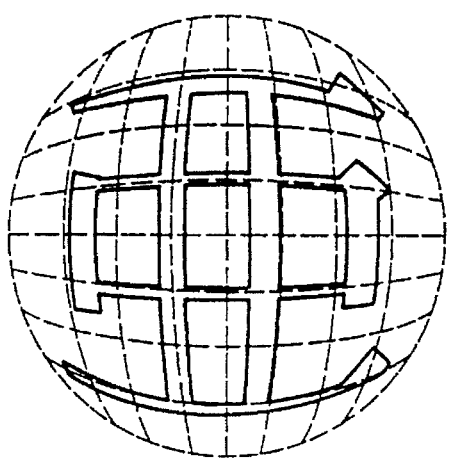
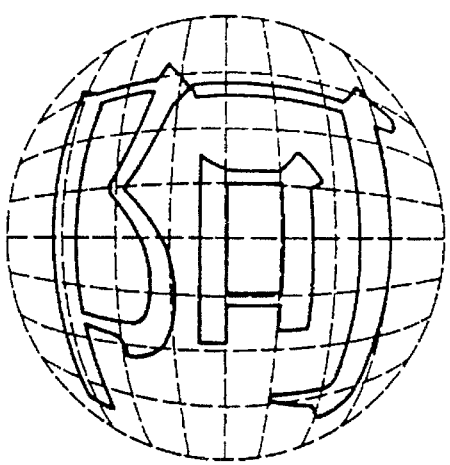
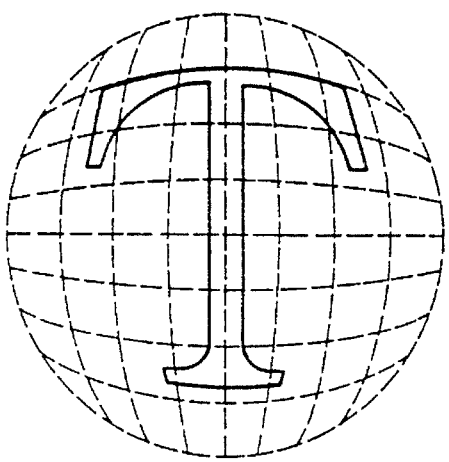

FIG. 30

| PATTERN CODE | SIZE | DISPLAY POSITION | PATTERN COLOR | | | TRANSFORMATION | | FRAME |
|---|---|---|---|---|---|---|---|---|
| | | | COLOR | BACKGROUND COLOR | PATTERN | SHAPE | DEGREE | |
| RECTANGLE 1 | (40, 10) | (20, 30) | ○ | — | 3 | ○ | ○ | ○ |
| CAPITAL LETTER T | (10, 10) | (20, 30) | ○ | — | — | ○ | ○ | — |
| CAPITAL LETTER E | (10, 10) | (30, 30) | ○ | — | — | ○ | ○ | — |
| CAPITAL LETTER S | (10, 10) | (40, 30) | ○ | — | — | ○ | ○ | — |
| CAPITAL LETTER T | (10, 10) | (50, 30) | ○ | — | — | ○ | ○ | — |
| --- | --- | --- | --- | --- | --- | --- | --- | --- |

F I G. 31
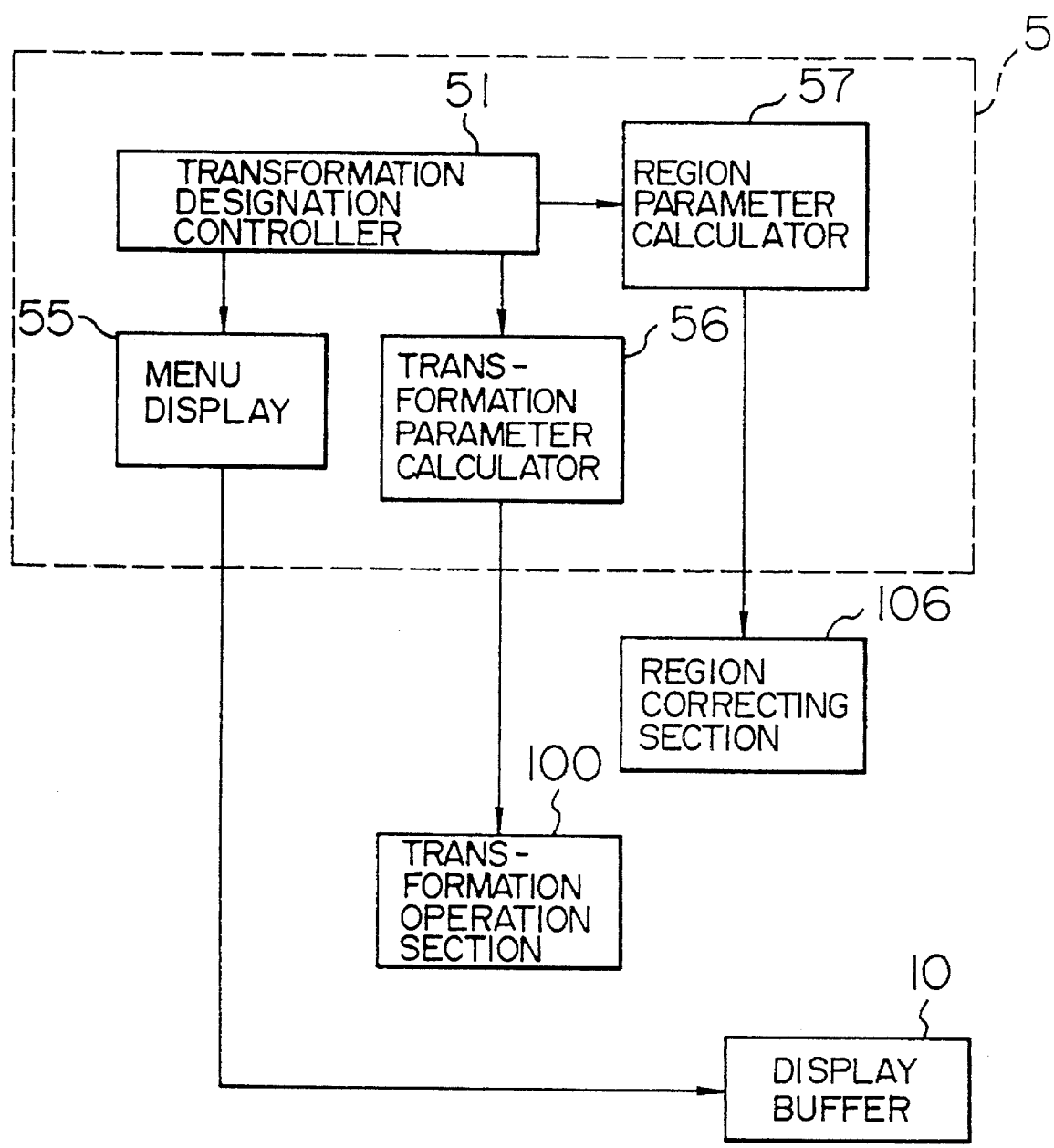

| CIRCLE 1 |
|---|
| POINT 1 |
| CURVE |
| POINT a |
| POINT b |
| POINT 2 |
| CURVE |
| ⋮ |

| CIRCLE 1 |
|---|
| POINT 1 |
| POINT 3 |
| POINT 4 |
| POINT 5 |
| POINT 2 |
| CURVE |
| ⋮ |

| CIRCLE 1 |
|---|
| POINT 1 |
| POINT 6 |
| POINT 3 |
| POINT 4 |
| POINT 5 |
| POINT 7 |
| POINT 2 |
| CURVE |
| ⋮ |

F I G. 38

$$\begin{cases} X'' = t \cdot \dfrac{p+2}{2 \cdot t + p \cdot |2 \cdot X - t|} \cdot (X - \dfrac{t}{2}) + \dfrac{t}{2} \\ Y'' = -w \cdot (2 \cdot Y - s) \cdot \dfrac{(p+2) \cdot |2 \cdot X - t|}{2 \cdot t + p \cdot |2 \cdot X - t|} + Y \cdot (2 \cdot w + 1) - s \cdot w \end{cases}$$

WHERE  $p = \dfrac{4 \cdot w}{4 \cdot w + 1}$

EQUATION ⑦

$$\begin{cases} X'' = X \\ Y'' = Y - \dfrac{w \cdot s \cdot |2 \cdot X - t|}{t} + w \cdot s \end{cases}$$

EQUATION ⑧

$$\begin{cases} X'' = \dfrac{t}{2} - (Y + \dfrac{t}{2}) \cdot \cos(\dfrac{\pi}{t} \cdot X) \\ Y'' = (Y + \dfrac{t}{2}) \cdot \sin(\dfrac{\pi}{t} \cdot X) \end{cases}$$

EQUATION ⑨

FIG. 39A
| CLASSIFICATION \ SIZE | 0~20 | 20~40 | 40~80 | 80~ |
|---|---|---|---|---|
| GENERAL PATTERN ANGULAR GOTHIC | ▪ | ■ | ■ | ■ |
| CIRCULAR GOTHIC | • | • | ● | ● |
| MING STYLE | - | ▬ | ▬ | ■ |
PEN TIP PATTERN MATRIX
FIG. 39B
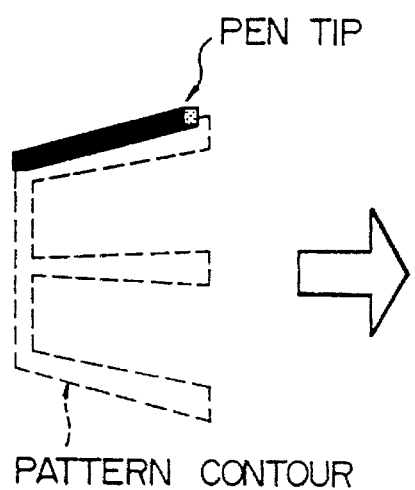
PEN TIP
PATTERN CONTOUR
FIG. 39C
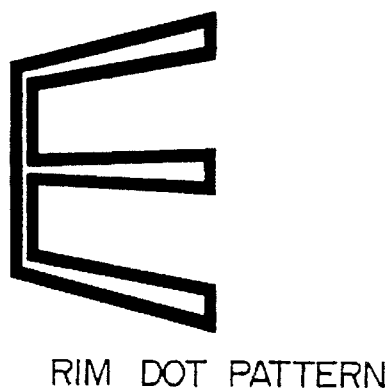
RIM DOT PATTERN

CHARACTER AND FIGURE TRANSFERRING SYSTEM

This is a continuation of U.S. application Ser. No. 07/931,199 filed Aug. 17, 1992, now abandoned.

BACKGROUND OF THE INVENTION

The present invention relates to a character and pattern transformation (deformation) processing system capable of transformation processing of a character set (train) or a pattern set (group) at a time.

In outline font characters or patterns widely used for computer graphics systems such as the DTP (Desk-Top Publishing) system, the word processor, the CAD (Computer Aided Design) system, etc., sample points representing the contour line of a character or pattern are calculated, and the character or pattern is approximated by segments of straight lines or curves passing the sampling points. In many cases, a mass of vectorial coordinate points or control codes for generating each line segment are stored as a data (hereinafter referred to as "the outline data").

According to this method, as compared with the storage of bit images, the compression rate is high. Also, since font parameters are expressed as vectorial points on a coordinate plane (hereinafter referred to as "the mesh") of a predetermined size, arithmetic operations for enlargement or compression may be effected at vectorial points of the font data. The result of the arithmetic operations is developed by interpolation with straight lines or curves, thereby making it possible to produce an enlarged or compressed character or the like having a smooth contour without sacrificing the quality.

A conventional method for transforming an outline data to generate a variety of characters and patterns consists of geometric operations such as affine transformation or projection transformation of a coordinate data in the outline data as described above in accordance with the user designation including revolutions, enlargement/compression, one-point perspective projection, inclination, etc.

In transforming a plurality of characters or patterns constituting a character set or a pattern set, the above-mentioned method is used to transform the characters or patterns one by one thereby to transform the whole character set or pattern set.

Also, there is a conventional method for transforming the whole of a character set or a pattern set developed to a bit image by increasing or decreasing the bits locally in accordance with a frame of shape. An example of the prior art is disclosed in JP-A-02-296292.

SUMMARY OF THE INVENTION

An object of the present invention is to provide a system and a method for character and pattern transformation capable of transforming the whole of a character set or a pattern set in comparatively simple way with a predetermined regularity.

Another object of the present invention is to provide a character and pattern processing system capable of displaying the whole of a character set or a pattern set in easily visible fashion.

As described above, the art of transforming a character set or a pattern set is conventionally well known.

In a method for transforming characters or patterns making up a character set or a pattern set, as the case may be, one by one, in accordance with a base line given as an input, however, the transformation is impossible other than along the one-dimensional change of a base line. Also, in view of the fact that the characters or patterns making up a character set or a pattern set are transformed one by one in accordance with an input base line, but the whole of a character set or a pattern set is not transformed one at a time in accordance with a series of rules, the user is required to transform characters or patterns one by one while considering the shape of the whole of a character set or a pattern set, thus imposing a considerable time and labor on the user.

According to the method for transforming the whole of a character set developed to a bit image by increasing or decreasing bits locally in accordance with a frame of shape, on the other hand, the fact that the number of picture elements is changed after development to a bit image undesirably causes a jaggy contour of a pattern.

In both of the above-mentioned methods, a transformed condition is designated by a frame of shape or line, and therefore it is impossible to produce various transformations of a character or a pattern with the internal density changed, for example, as shown in FIG. 8.

According to the present invention, there is provided a character and pattern transformation processing system which is capable of realizing with comparative simplicity the transformation of the whole of a character set or a pattern set one at a time as desired with a predetermined regularity or rule.

In order to achieve the above-mentioned objects of the present invention, according to one aspect of the present invention, there is provided a character and pattern transformation processing system for transforming a character or a pattern by transforming the character or pattern into an outline data defined by coordinate information representing straight line or curve segments constituting the contour line of the character or pattern, wherein for transforming a character set or a pattern set made up of a plurality of characters or patterns respectively at a time, with regard to a rectangular region containing the character set or pattern set to be transformed, positions of each character and pattern relative to the particular rectangular region are added to an outline data of all the characters and patterns in the rectangular region, and the resulting outline data is divided by the size of the rectangular region, followed by a transformation operation for transforming a character or a pattern, after which the outline data subjected to the transformation operation is multiplied by the size of the rectangular region.

According to another aspect of the present invention, when transforming a character set or a pattern set made up of a plurality of characters or patterns respectively at a time and displaying them at a designated display position, the relative positions are subtracted from an outline data resulting from the multiplication of the size of the rectangular region.

The aforementioned transformational operations include the one in which a coordinate plane having the coordinate points of an outline data of a character or a pattern constituted thereon is assumed to be a mesh pattern with a grid, the one in which the shape of the mesh pattern is a quadrilateral connecting four given apexes, the one in which the grid density of the mesh pattern is changed, and the one in which the grid line property of the mesh pattern is changed.

A particular transformational operation is designated by displaying examples of transformed shapes of a mesh pattern in a table and having the user select one of them, or having the user designate the apex positions or the grid line conditions after transformation of the mesh pattern.

According to the present invention, a rectangular region containing a character set or a pattern set is assumed to be a transformation unit, and the character set or the pattern set is transformed simultaneously by transforming the rectangular region at a time.

Specifically, with regard to a rectangular region containing a character set or a pattern set to be transformed, the position of each character or pattern relative to the rectangular region is added to an outline data of all the characters or patterns included in the rectangular region, and then the resulting outline data with relative positions added thereto is divided by the size of the rectangular region, thereby approximating an outline data of a character or a pattern making up a unit for transformational operation. The transformational operation is effected for transforming a character or a pattern, after which the outline data subjected to the transformational operation is multiplied by the size of the rectangular region thereby to restore the original size.

In view of the fact that the user thus designates the way of transforming a character set or a pattern set by how a mesh pattern is to be transformed, the designation is facilitated according to a transformed image.

Further, if there are a plurality of types of comparatively simple transformational operations having independent effects prepared, a complicated transformation is made possible by combination of transformational operations required for transformation of a mesh pattern as designated.

As explained above, according to the present invention, a character set or a pattern set comprised of a plurality of characters or patterns, respectively, can be transformed in whole into a desired shape in a comparatively simple fashion.

A superior effect unobtainable by the prior art is attained according to the present invention as described above. In addition, explanation will be made about a character and pattern processing system and method for displaying transformed characters and patterns in an easily visible manner as an improvement of the present invention.

If a document is to be prepared by arranging vectorially-displayed characters, symbols, patterns or the like on a background pattern, the background is prepared or read from a data base or the like and displayed, with the document or symbols arranged thereon. The transformed characters, symbols or patterns according to the present invention are also displayed by this method.

In a document prepared in this way, a character written on a background pattern may be difficult to read, if the background pattern has a figure of the same color as the character. Also, when it is desired to write a character or a pattern on an angular background pattern, it would be necessary to prepare a new angular or corrugated pattern or character.

According to another aspect of the present invention, there is provided a character and pattern processing system comprising a transformation section for transforming, in different manners, portions of a pattern or a character of vectorial display type divided by a boundary line, and a boundary correcting section for correcting the pattern data on the boundary line before transformation, thereby making it possible to transform an angular or corrugated pattern. Also, a pattern frame of a different color from the surrounding patterns is automatically generated and displayed, and thus a pattern is arranged on a figure or background to prevent the pattern from becoming invisible.

According to still another aspect of the present invention, there is provided a character and pattern processing system wherein a boundary correcting section searches for a line segment crossing a boundary in a vectorial coordinate data of a pattern, calculates a coordinate point where the boundary crosses the line segment, and adds the coordinate to the pattern data, thereby making it possible to express an angular or corrugated shape. Further, a pattern somewhat thicker than the pattern to be displayed is prepared and plotted in a different color from the pattern to be displayed at a pattern display position, over which the pattern to be displayed is plotted. The pattern to be displayed is thus rimmed. In this way, a pattern or character is displayed on a figure or background in an easily visible form.

As seen from above, according to the present invention, a transformed character or pattern is capable of being displayed in an easily visible manner against a background.

BRIEF DESCRIPTION OF THE DRAWINGS

FIG. 4 is a diagram for explaining an example of a display data table.

FIG. 6 is a diagram for explaining an example of a transformations parameter data.

FIG. 9 is a diagram for explaining an example of transformation effect according to the same embodiment.

FIG. 14 is a diagram for explaining a list of numerical equations used according to the same embodiment.

FIG. 18 is a diagram for explaining an example of pattern distortion resulting from the change of the grid line quality.

FIGS. 19A and 19B are diagrams for explaining causes of pattern distortion resulting from the change of the grid line.

FIGS. 24A and 24B are diagrams for explaining the effect of correction.

FIG. 30 shows an example of a display information table used in the system shown in FIG. 28.

FIG. 31 is a detailed diagram showing a transformation designating section 5 of the system shown in FIG. 28.

FIG. 38 shows an example of a transformational operation equation used in the system shown in FIG. 28.

FIGS. 39A, 39B and 39C show an example of a pen tip pattern matrix used in a rim preparation section 16 shown in FIG. 28.

DESCRIPTION OF THE PREFERRED EMBODIMENTS

Embodiments of the present invention will be described below with reference to the accompanying drawings.

Figure 1:
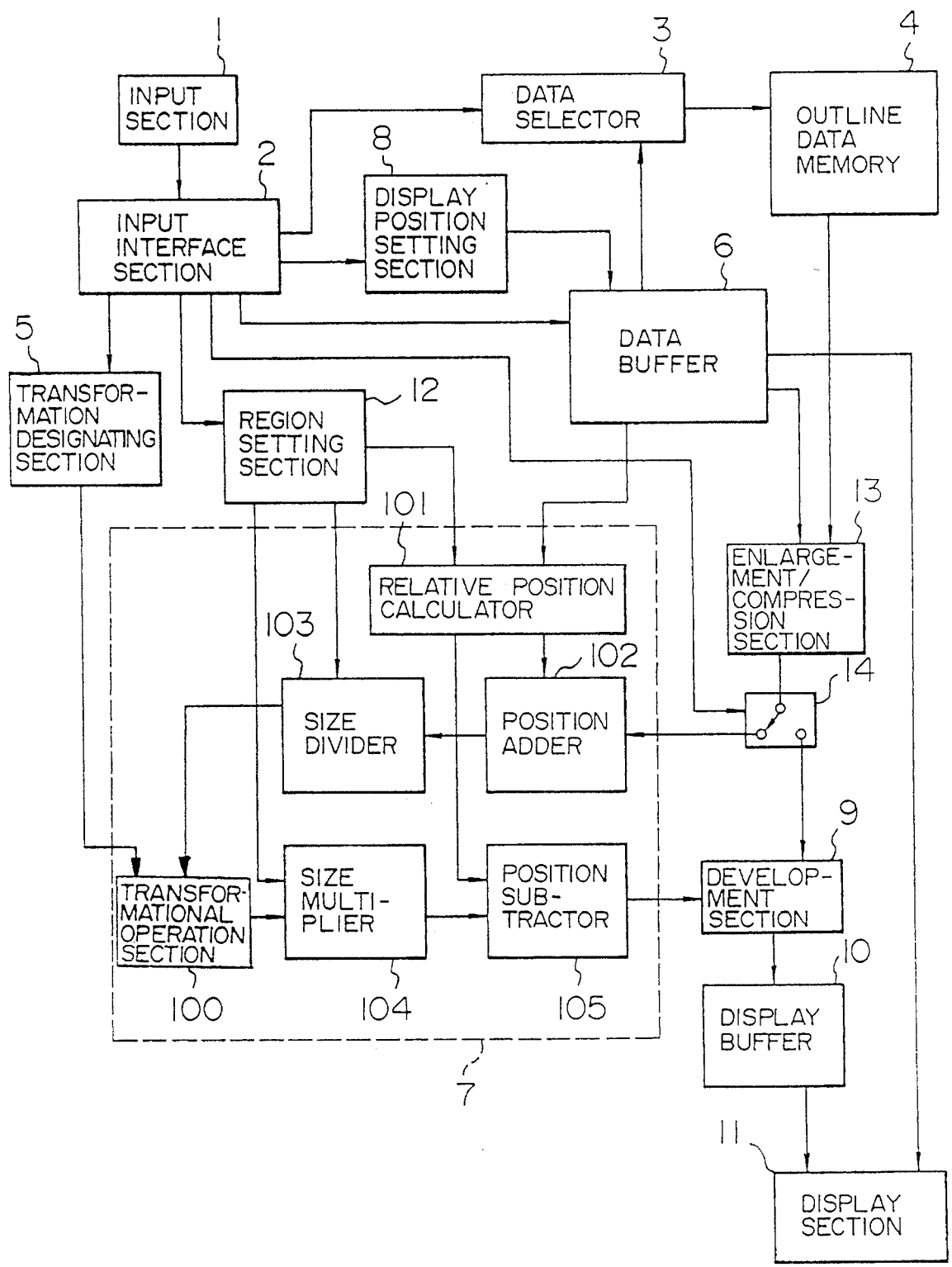
FIG. 1 is a diagram showing the configuration of a character and pattern transformation processing system according to an embodiment of the present invention.

A configuration of a character and pattern transformation processing system according to an embodiment of the present invention is shown in FIG. 1.

A character and pattern transformation processing system according to the present embodiment comprises an input section 1 such as a keyboard or mouse for entering user instructions, an input interface section 2 for converting instructions from the input section 1 into control signals used for various sections, an outline data memory 4 such as a hard disk for storing the outline data of characters and patterns, a data selector 3 for reading an intended outline data from the outline data memory 4 upon instructions from the user, a data buffer 6 for temporarily storing the outline data read out, a display position setting section 8 for calculating the display position of the characters and patterns displayed on a display section 11, a region setting section 12 for setting a transformation region upon instructions of the user, a transformation designating section 5 for designating the manner in which characters or patterns are to be transformed, an enlargement/compression section 13 for changing the size of characters and patterns on display upon instructions of the user, a development section 9 for generating interpolation line segments of a straight line or curve from the outline data and preparing a dot image of a contour line, a development buffer 10 such as a bit map memory for temporarily storing the dot image developed, a display section 11 for displaying characters and patterns developed, and a change-over switch 14.

Numeral 7 designates a transformation section including a transformational operation section 100, a relative position calculator 101, a position adder 102, a size divider 103, a size multiplier 104 and a position subtractor 105.

Figures 2A, 2B:
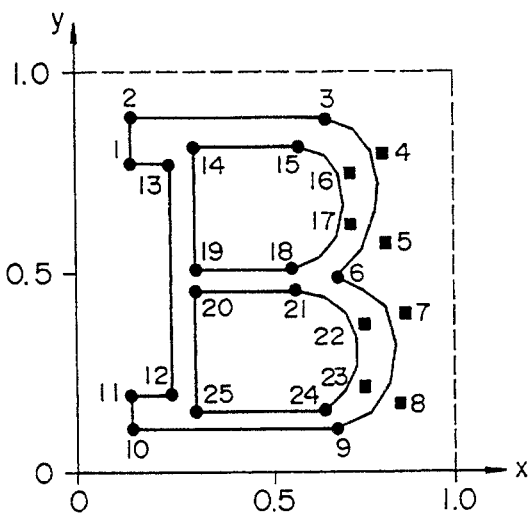
FIGS. 2A and 2B are diagrams for explaining an example of an outline data.

FIG. 2B shows an example of outline data stored in the outline data memory 4.

For facilitating the understanding of the system under consideration, the character and pattern data are assumed to be defined in a size accommodated in a (x, y) coordinate of 1.0×1.0 and the contour line by straight lines and three-dimensional Bezier curves as shown in FIG. 2A. A segment of a three-dimensional Bezier curve can be defined by four coordinate points including a starting point, an ending point and two control points. As a result, the outline data memory 4, as shown in FIG. 2B, has arranged therein an ID code for identifying the data, a closed curve starting code for indicating an end of each closed curve constituting a contour, a curve designation code for indicating the interpolation by a Bezier curve, a code data such as an end code indicating the end of a data and a coordinate data on the X and Y coordinates providing a reference point for generating a straight line or a Bezier curve. Coordinate data is a sequential arrangement of coordinate corners, and the control points of a Bezier curve are discriminated by prefixing a curve code. An outline data is not necessarily limited to the above-mentioned example as far as the contour of a character or a pattern is defined using a mass of representative coordinate points. An outline data defined on a coordinate plane 1024×1024 in size, for example, is usable directly with the present system by dividing the data by 1024 for transformation and multiplying the result by 1024.

Figure 3A:
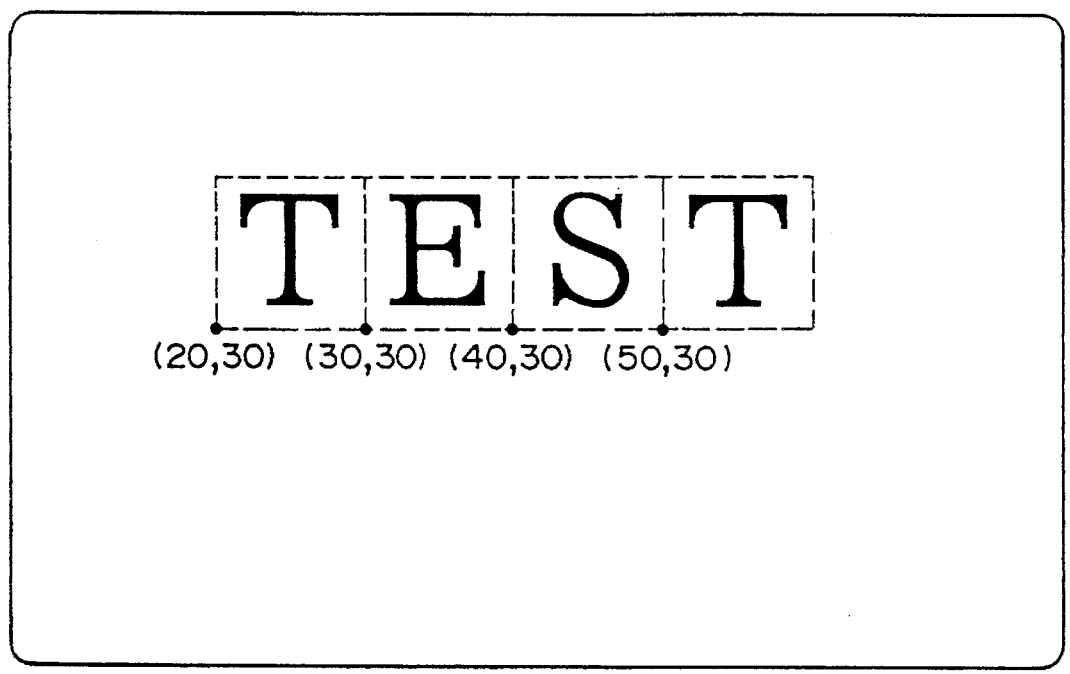
FIGS. 3A and 3B are diagrams for explaining an example of transformation effect according to the same embodiment.
Figure 3B:
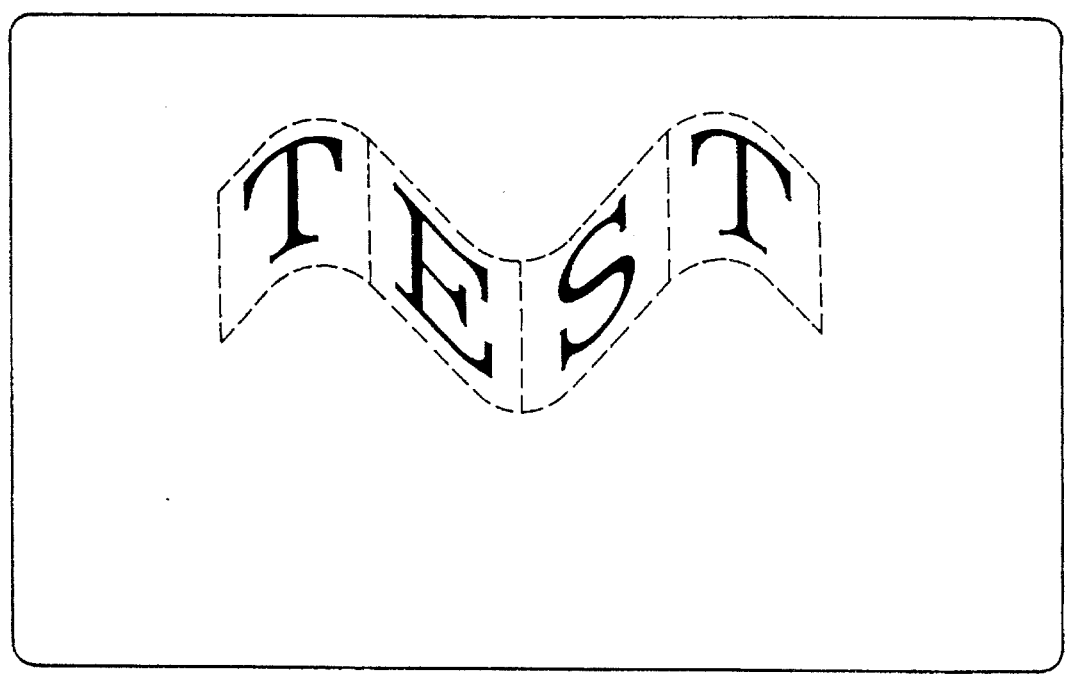

Now, the operation of the present system will be described with reference to a case in which a character set with four characters "TEST" arranged in lateral direction as shown in FIG. 3A is to be transformed into a shape as shown in FIG. 3B.

According to the present system, non-transformed characters and patterns are inputted and displayed to display character sets or pattern sets, out of which a desired one is selected and transformed while designating a transformed shape and a display position.

First, reference is made to the operation for displaying characters and patterns not transformed.

When the user enters a desired character or a pattern from the input section 1, an ID code thereof is stored in the data buffer 6. The data buffer, as shown in FIG. 4, has a display data table for storing attribute data such as an ID code, a display position, a size and the need of transformation of the character or pattern displayed on the display screen of the display section 11. According to the present system, the display position is indicated as a position of the origin of a coordinate plane containing the character and pattern on the display screen. The display screen, as shown in FIG. 5, has an origin at the lower left corner thereof, with the x axis extending rightward and the y-axis upward. The size is indicated by the length of two sides (including the lateral side along x axis and the longitudinal side along y-axis). With regard to the need of transformation, "transformation not needed" is indicated by "0", and "transformation needed" by other means.

When the user enters a desired position of character or pattern display from the input section 1, related display position information is stored in the display data table of the data buffer 6. In the case where no display position is entered, the display position setting section 8 calculates an appropriate display position and stores it in the data buffer 6. When a character set is entered and displayed, for example, the user does not designate the display position of each character. Instead, when each of the second and subsequent characters are entered, the display position of the next character is calculated and stored in the data buffer 6 automatically in accordance with a format such as the direction of entry or the interval with adjacent characters.

When the user enters the size of a character or a pattern by way of the input section 1, on the other hand, the particular size is stored in the display data table of the data buffer 6. If no size is designated, by the way, the original size of 1.0×1.0 remains unchanged.

After the data of the next character or pattern is stored in the display data table of the data buffer 6, the data selector 3 reads out an ID code from the data buffer 6, and also reads out an outline data associated with the ID code from the outline data memory 4 and applies it to the enlargement/compression section 13.

The enlargement/compression section 13 enlarges or compresses the x and y coordinates of the coordinate data of the outline data into a size stored in the display data table of the data buffer 6, and applies it to the development section 9. The outline data of the system according to the present embodiment has an original size of 1.0×1.0. The desired size, therefore, is obtained simply by multiplying the lengths along x and y directions by the x and y coordinates.

In the process, the change-over switch 14 is turned in such a manner as to apply an outline data enlarged or compressed by the enlargement/compression section 13 to the development section 9.

As the next step, the development section 9 plots a contour line in accordance with the coordinate information of the outline data, whereby a dot image is developed and stored in the development buffer 10. In the case of developing an outline data as shown in FIG. 2B and preparing a dot image as shown in FIG. 2A, for example, a straight line is generated up to a break point coordinate following the coordinate point next to the closed curve starting code as a starting point, and further a straight line is drawn up to the next coordinate point. Since a curve code is immediately followed, a Bezier curve is drawn to the next break point with the following two points as control points. This process is repeated to develop a contour line.

The display information of a character or a pattern developed to a dot image is displayed by the display section 11 at the display position stored in the display data table of the data buffer 6.

If a character set "TEST" is to be displayed as shown in FIG. 3A, for instance, an interval 0 is set along the lateral direction, after which a character T having the size of 10×10 is entered. When a display position (20, 30) is designated, a column of "capital letter T" on the first line is prepared as shown in FIG. 4 in the display data table of the data buffer 6. The outline data of the letter T read out of the outline data memory 4 by the data selector 3 is enlarged to (10×x, 10×y) at the enlargement/compression section 13 and developed by the development section 9. The letter "T" is displayed at the position (20, 30) on the display screen of the display section 11. After that, with regard to the three letters "E", "S" and "T", each time "E", "S" or "T" is entered, the display position setting section 6 calculates the display position of each character with the lateral direction as O, so that columns from "capital letter E" on the second line to "capital letter T" on the fourth line are prepared as shown in FIG. 4 in the display data table of the data buffer 6. The outline data of "capital letter E", "capital letter S" and "capital letter T" read out of the outline data memory 4 by the data selector 3 are enlarged to (10×x, 10×y) at the enlargement/compression section 13 and developed by the development section 9. The letters "E", "S" and "T" are displayed successively at the positions (30, 30), (40, 30) and (50, 30), respectively, on the display screen, and the character set "TEST" shown in FIG. 3A is thus displayed on the display screen.

Now, explanation will be made about the operation for transforming one given character sets or pattern sets displayed on the display screen in the above-mentioned manner and displaying a transformed character set or pattern set.

First, the user selects one character sets or pattern sets displayed on the display screen. If a character set comprised of four characters "TEST" is desired for transformation, for instance, the user selects the four characters on the display screen by way of the mouse or the like.

Figure 5A:
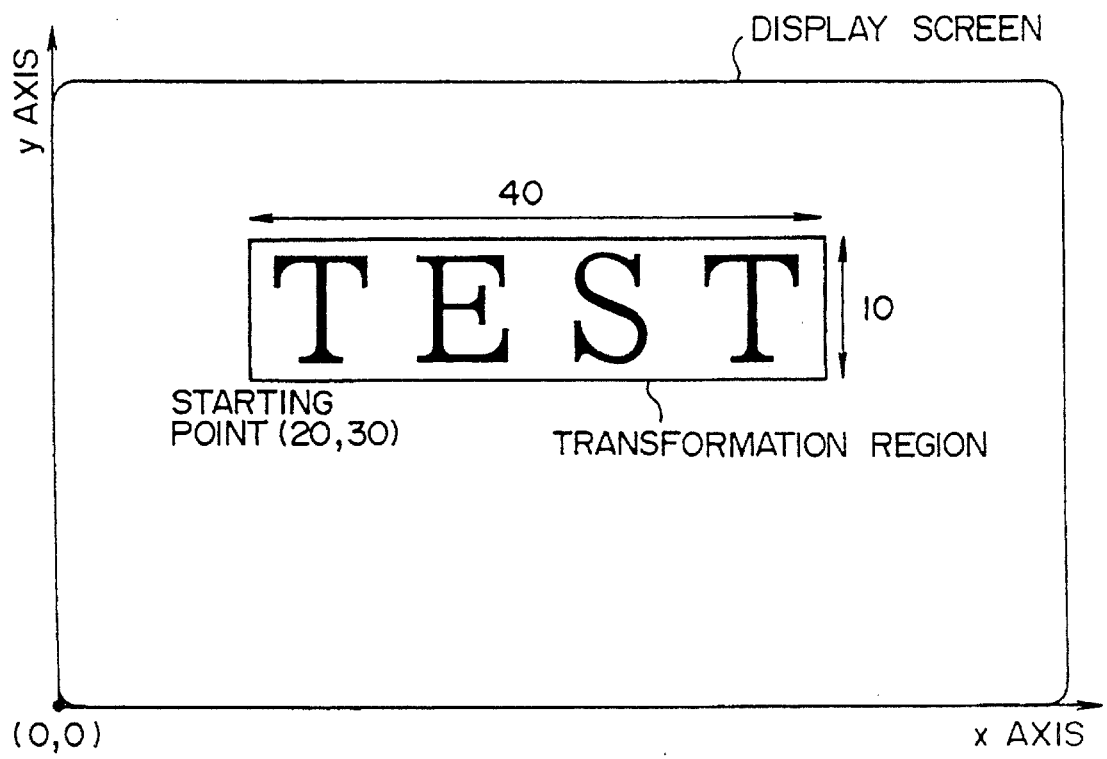
FIGS. 5A and 5B are diagrams for explaining an example of a transformation region.

Upon selection of a character set or a pattern set to be transformed, "1" is stored in the column "transformation needed or not needed" in the display data table of the data buffer 6 for the characters and patterns making up the character set or the pattern set selected. As the next step, the region setting section 12 sets a region surrounding the selected character set or pattern set as a transformation region. The transformation region is set manually by the user or automatically by the system in such a manner as to contain all the selected character sets or pattern sets to be transformed. When it is desired to transform a character set, for example, a transformation region is often conveniently set as a minimum rectangle surrounding all the characters or the coordinate plane of all the characters of the character set. Assuming that the four characters "TEST" shown in FIG. 3A is selected as an object of transformation, the region setting section 12 calculates the starting point of the transformation region as (20, 30) and the size of the transformation region as (40, 10) as shown in FIG. 5A.

If a desired character set or a pattern set is to be transformed, what is first required is to designate the manner in which or how the character set or the pattern set is to be transformed. According to the present system, a transformation region set as mentioned above is assumed to be a mesh as shown in FIG. 5B, and a transformed shape is designated in the form of the particular mesh.

The designation of a transformed shape is effected at the transformation designation section 5. The transformation designation section 5 displays a list of meshes providing transformation examples, and has the user select one of them. The transformation section 7, on the other hand, transforms the characters train or the pattern set to be transformed in such a manner as to be attached to the mesh for the selected transformation example.

Figure 5B:
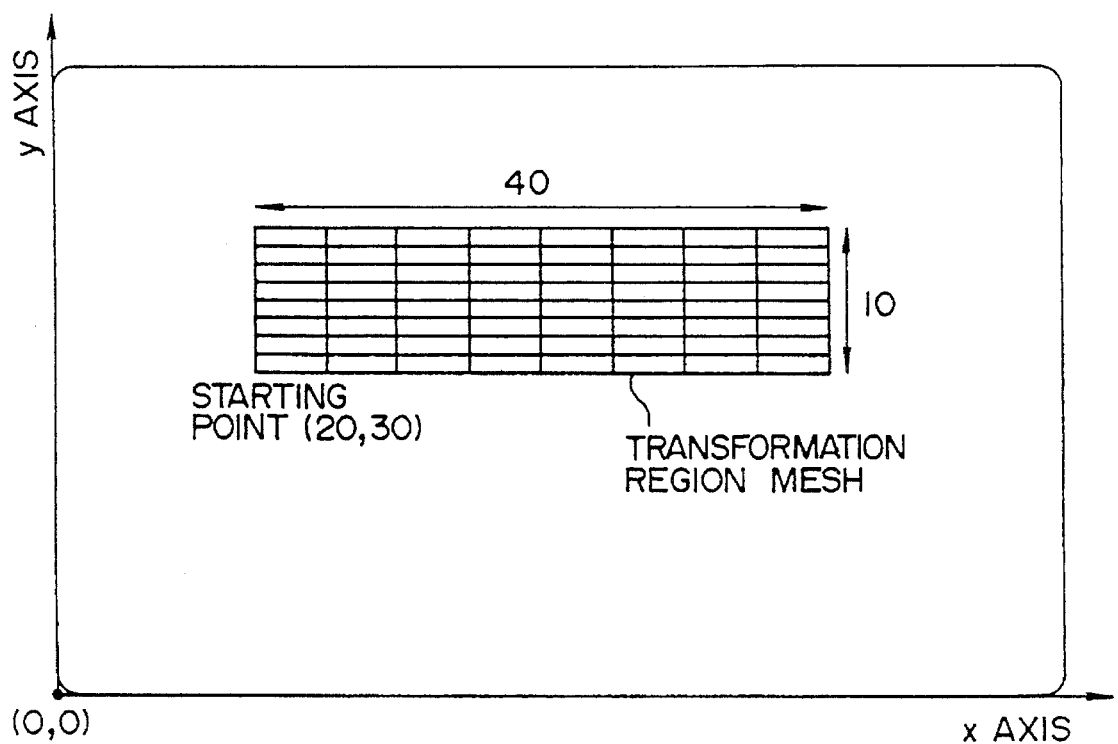

First, in order to display a list of meshes providing transformation examples, the outline data of mesh is transformed. The outline data of mesh is stored in the transformation designation section 5 in such a construction as shown in FIG. 2 in a similar manner to the outline data of characters or patterns. The mesh outline data, developed and displayed, makes up a square having a mesh grid 1.0×1.0 in size. FIG. 5B shows a case in which a mesh outline data is displayed in a form enlarged to the size of the transformation region (40×10 in the case of "TEST").

In the transformation designation section 5, various mesh shapes generated from an internally-stored mesh outline data by the transformational operation at the transformational operation section 100 of the transformation section 7 are displayed in a form enlarged or compressed to the size of the transformation region, and a list of transformed shapes is produced as examples of the transformation. The transformational operation at the transformational operation section 100 of the transformation section 7 will be described later. According to the present system, a character or a pattern is transformed by relocating the coordinate data by arithmetic operation. Therefore, a transformation is realized by attaching a parameter associated with an intended shape to a coordinate relocating operation formula processed by the transformational operation section 100. In view of this, the transformation designation section 5 includes a transformation parameter table for storing specific parameters for transformed shapes providing transformation examples as shown in FIG. 6. The parameters of the transformation parameter table are applied sequentially to the transformation section 7, and have the transformation section 7 transform the mesh outline data stored therein.

As an alternative, the mesh outline data transformed as above may be stored in advance in the outline data memory 4, and successively read out and enlarged or compressed to the size of a transformation region at the enlargement/ compression section 13, thereby preparing a list of transformed shapes. Also, a large transformation region may be compressed or divided into several pages as desired for display.

Figure 7:
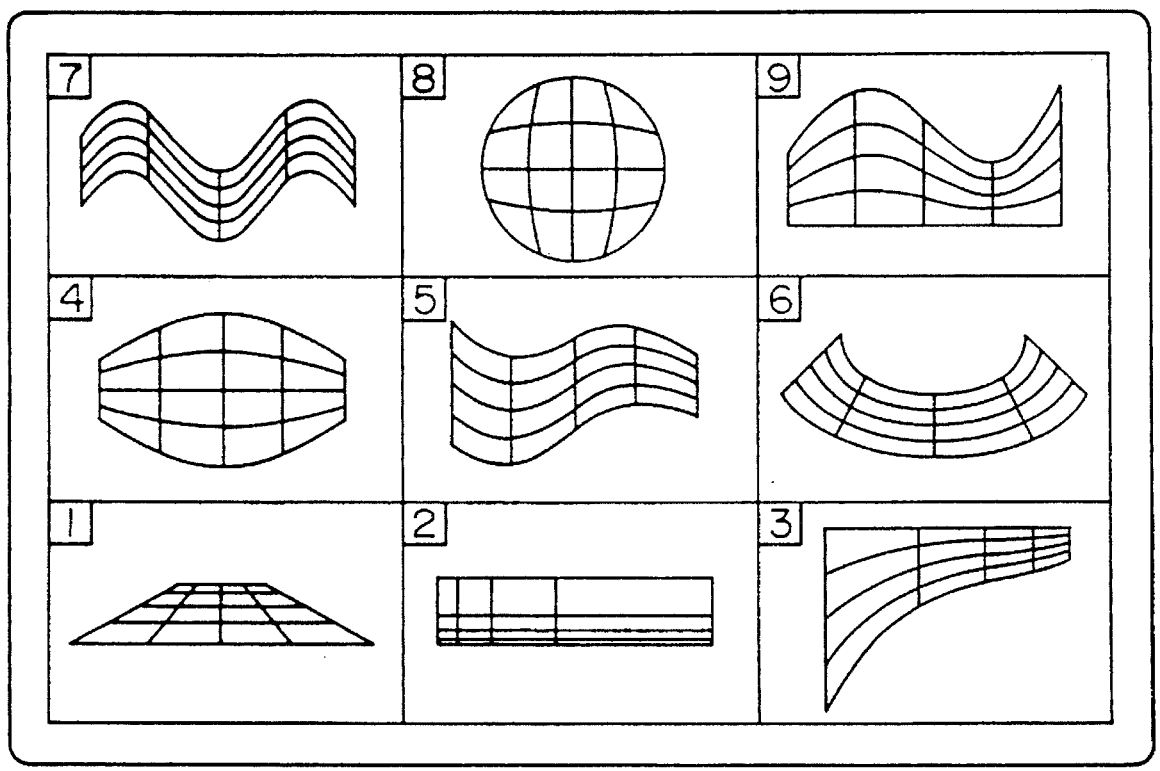
FIG. 7 is a diagram for explaining an example of a transformed shape selection menu.

A list of transformed shapes thus prepared provides a menu for selecting a transformed shape. FIG. 7 shows a menu for selecting transformed shapes with the transformation region mesh of FIG. 5B transformed by use of nine parameters specified in FIG. 6.

Now, assume that the user selects a desired transformed shape from the transformed shape selection menu on display by pointing with mouse or by keyboard entry of a number. The transformation designation section 5 reads a parameter for transformational operation in accordance with the selected transformed shape and applies it to the transformational operation section 100 of the transformation section 7.

An outline data having ID codes of all the characters and patterns making up a character set or a pattern set to be transformed is read out of the outline data memory 4 by the data selector 3, enlarged or compressed to the size stored in the display data table of the data buffer 6 by the enlargement/ compression section 13, and applied to the transformation section 7. In the process, the change-over switch 14 is turned in such a manner that the output destination of the enlargement/compression section 13 is the transformation section 7.

The first step of processing in the transformation section 7 is to calculate relative display positions of characters and patterns making up the character set and pattern set in the transformation region. Specifically, the starting point of the transformation region is subtracted from the display position of each character and pattern of the character set and the pattern set to be transformed. In other words, assume that the starting point of the transformation region read from the region designating section 12 is (n, m), the size (N, M), and the display position of each character and pattern of the character set and pattern set read from the data buffer 6 ($x_0$, $y_0$). The relative coordinate point ($x_1$, $y_1$) is calculated as $x_1=x_0-n$, $y_1=y_0-m$.

As the next step, in the position adder 102, the relative coordinate point ($x_1$, $y_1$) thus calculated is added to each coordinate data of the outline data of each character and pattern of the character set and pattern set to be transformed. Further, the size divider 103 divides the coordinate data with the relative coordinate point added thereto by the size of the transformation region and applies it to the transformational operation section 100. Specifically, assuming that the coordinate value of the outline data of the character set and pattern set to be transformed outputted to the transformational operation section 100 is (X, Y), it follows that $X=(x+x_1)/N$, $Y=(y+y_q)/M$.

This reasoning is of the fact that since the transformational operation of the transformational operation section 100 is always effected for the size of 1.0×1.0, i.e., the size of a coordinate plane defined by a single character or pattern, the transformation region is required to be transformed into the particular size.

In the transformational operation section 100, the transformational operation for attaining a selected transformed shape is added to the coordinate value of the outline data produced from the size divider 103. The transformational operation section 100 will be described again later.

The outline data subjected to the transformational operation is multiplied by the transformation region size at the size multiplier 104, and further, a relative position is subtracted from the outline data at the position subtractor 105, so that the resulting reverse transformation by the position adder 102 and the size divider 103 restores the data format before the transformation processing. More specifically, the coordinate value (X, Y) which is outputted from the size divider 103 is transformed into (X", Y") by the operation section 100. Further, the coordinate value (X", Y") is transformed to the resultant value (X"×N–$x_z$, y"×M–$Y_1$) by the size multiplier 104 and the position subtractor 105. The resultant value is outputted from the transformation section 7.

The outline data subjected to the transformation processing as mentioned above is outputted to the development section 9, developed into a dot image as in the case of non-transformation, and displayed at the display position ($x_0$, $y_0$) on the display screen.

The transformation region of the character set "TEST", for example, has a starting point at (20, 30) and a size of (40, 10). Thus, the outline data of a mesh providing a transformation example is enlarged to (40, 10) times as large by the enlargement/compression section 13 thereby to display a transformation selection menu as shown in FIG. 7. The user selects a transformed shape from the transformation selection menu. Assume that he/she has selected "Transformation 7" in FIG. 7.

Once a transformed shape is determined, the transformation section 7 proceeds to transform characters to be transformed one by one. First, the relative position calculator 101 calculates relative coordinate points of characters to be transformed. The display position ($x_0$, $y_0$) of the first character "T" is at (20, 30), and therefore the coordinate point ($x_1$, $y_1$) of the display position as relative to the starting point of the transformation region is (0, 0). The relative coordinate point thus calculated is applied to the position adder 102. The outline data of "T" read from the outline data memory 4 by the data selector 7 is enlarged ten times as large in both x and y directions at the enlargement/compression section 13, and is applied to the position adder 102 through the change-over switch 14 turned to the transformation section 7. The position adder 102 adds a relative coordinate point to the coordinate data of the outline data produced from the enlargement/compression section 13. In the case under consideration where the relative coordinate point is (0, 0), the coordinate value remains unchanged even after addition of a relative coordinate point. The coordinate data with a relative coordinate point added thereto is divided by the transformation region size (40, 10) at the size divider 104. More specifically, the coordinate data (x, y) in the outline data of "T" read from the outline data memory 4 is changed to ((x×10−0)/40, (y×10−0)/10, which is applied to the transformational operation section 100 in the process from the enlargement/compression section 13 to the size divider 103.

The transformational operation section 100 is already supplied with a parameter for transformation into the desired shape from the transformation designating section 5 as described above. The coordinate data, after being subjected to the transformational operation, is relocated to such a position as to form a part of the desired transformation region shape. The size multiplier 104 multiplies the size of the transformation region, and the position subtractor 105 subtracts a relative position to restore the data structure before transformation, which is outputted from the transformation section 7. More specifically, the coordinate data (X", Y") outputted from the transformational operation section 100 is transformed into (X"×40−0, Y"×10−0) by the size multiplier 104 and the position subtractor 105. The outline data produced from the transformation section 7 is developed to a dot image and displayed at the display position (20, 30) on the display screen. As a result, the first transformed character "T" is displayed as shown in FIG. 3B.

Subsequently, "E" is calculated as a relative coordinate point (10, 0), "S" as a relative coordinate point (20, 0), and the last "T" as a relative coordinate point (30, 0), and similar operations are repeated to display transformed characters one by one. A transformed character set "TEST" is thus completed as shown in FIG. 3B. Also, transformed shapes of the character set "TEST" with "Transformation 1" to "Transformation 6", "Transformation 8" and "Transformation 9" designated in FIG. 7 are shown in FIG. 8.

Figure 8:
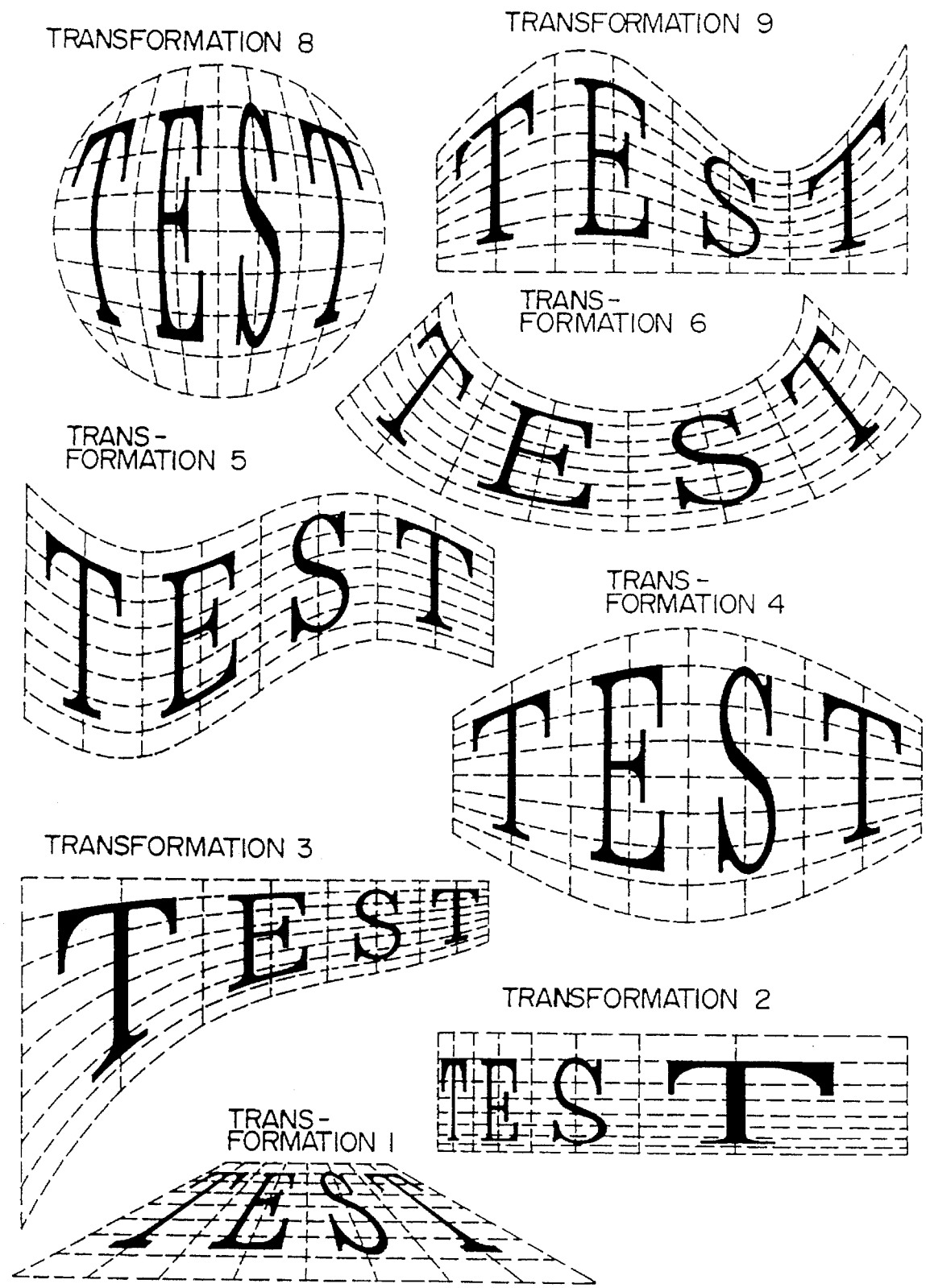
FIG. 8 is a diagram for explaining an example of transformation effect according to the same embodiment.
Figure 27A:
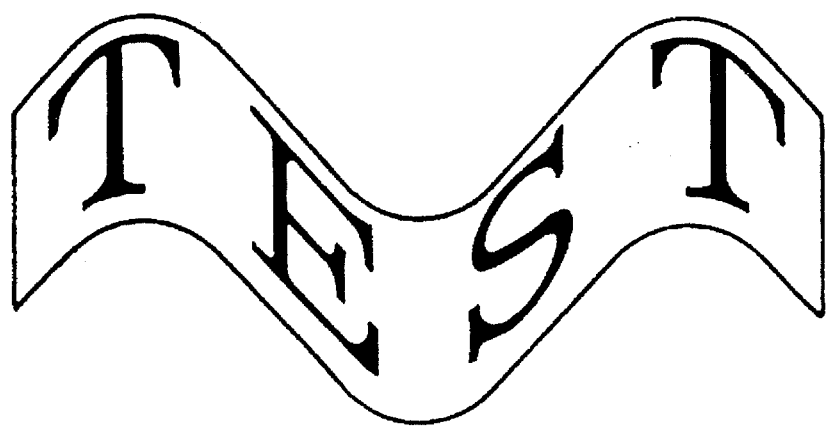
FIGS. 27A and 27B are diagrams for explaining an example of transformation effect according to the same embodiment.
Figure 27B:
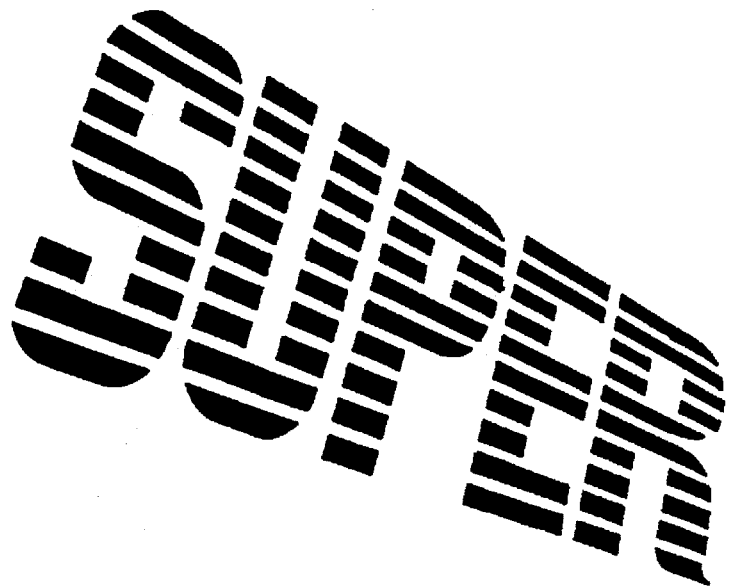

Although a character set is displayed over a transformed mesh in FIG. 8, it is of course possible to eliminate the mesh from the display. Further, as shown in FIG. 27A, a pattern of an outer frame of the mesh may be superposed on a transformed pattern and a transformed character set or pattern set displayed to produce various transformation effects. FIG. 27B, on the other hand, shows a case in which only lateral mesh lines are displayed in a color different from the transformed character set for attaining a variety of transformation effects.

Now, the transformational operation section 100 will be described in detail.

Figure 15:
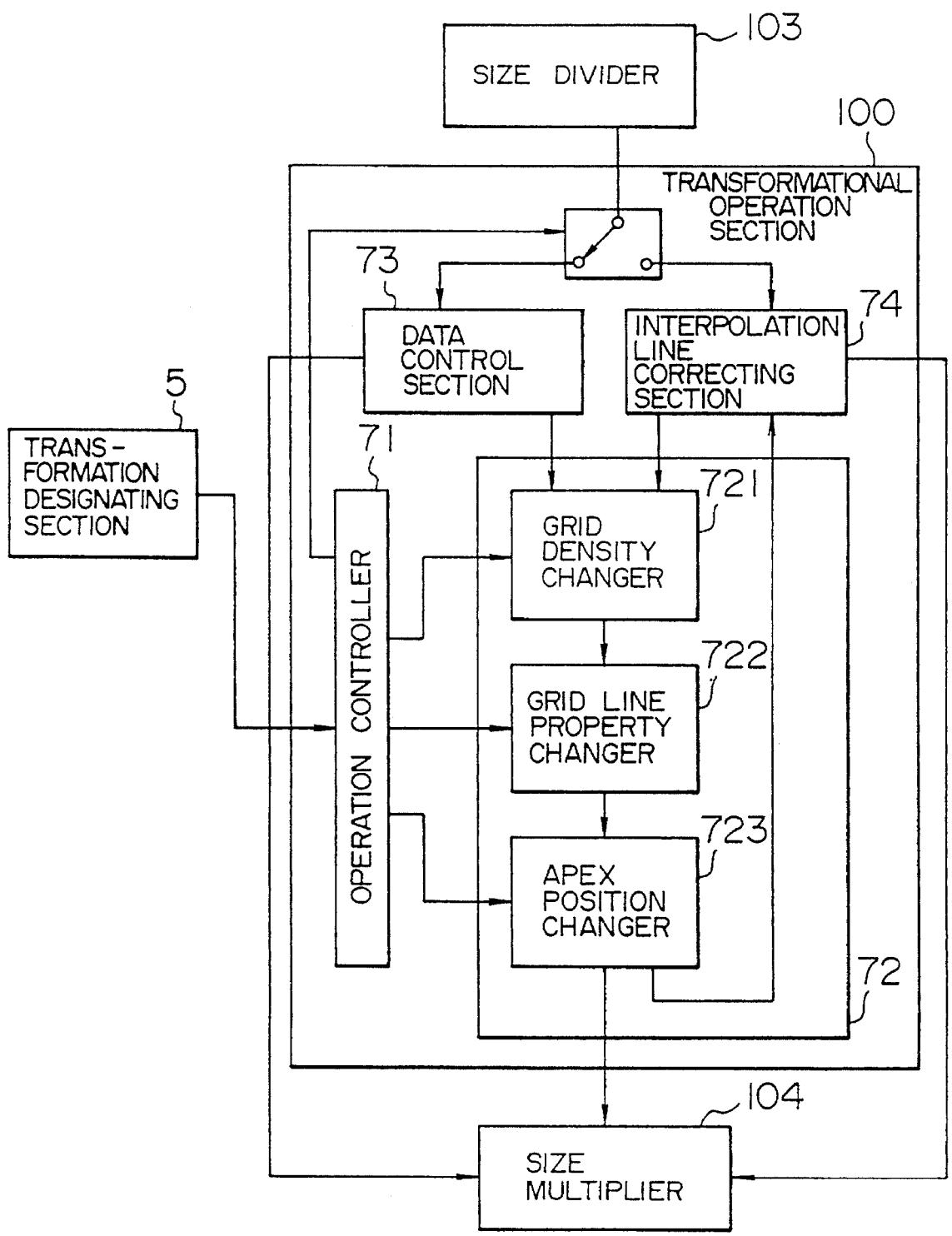
FIG. 15 is a diagram showing the configuration of a transformational operation section.

FIG. 15 is a diagram showing a configuration of the transformational operation section 100.

First, an operation controller 71 applies a parameter supplied from the transformation designating section 5 to the operation section 72.

Figure 16A:
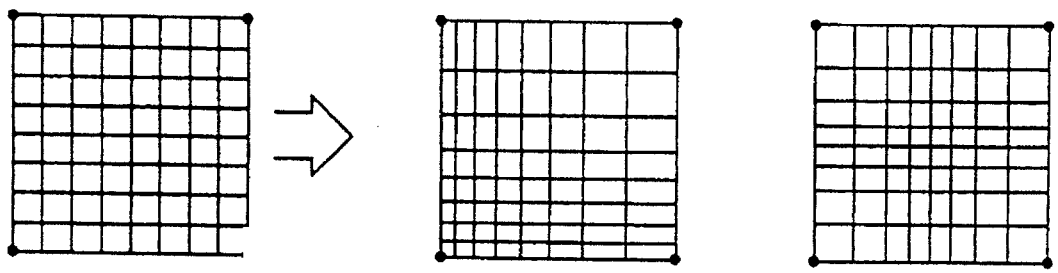
FIGS. 16A, 16B and 16C are diagrams for explaining types of transformation.
Figure 16B:
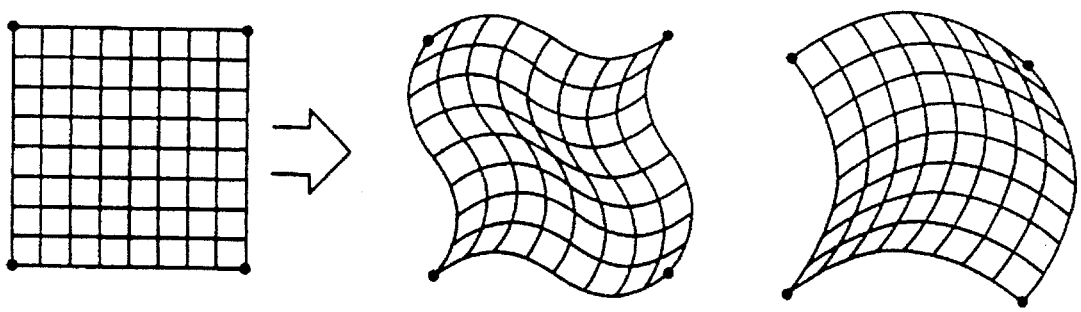
Figure 16C:
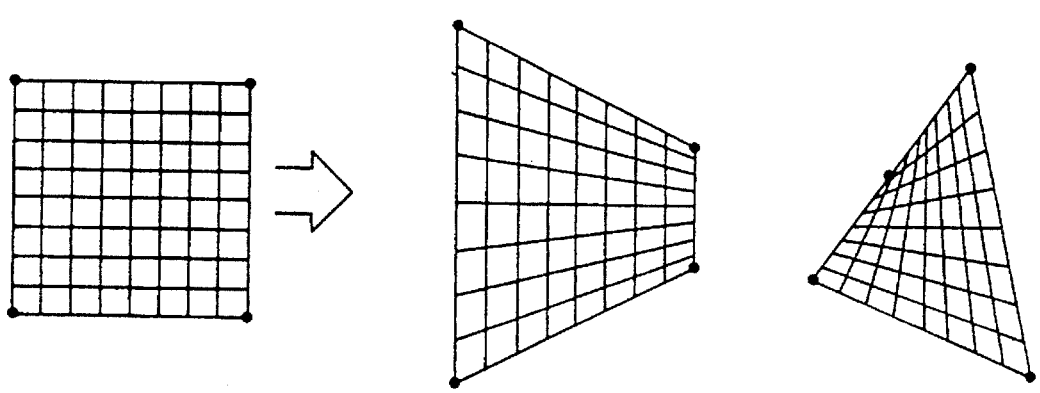

The operation section is divided into three independent transformation processing sections. The three types of transformation are illustrated in FIG.16. In a non-transformed state, i.e., in the condition shown to the extreme left, the mesh of the coordinate plane is a square, segmented by equidistant linear grid lines of mesh. The grid density of the equidistant coordinate plane grid lines is changed in such a manner as to be deflected in x and y directions as shown in FIG. 16A at a grid density changer 721, or the grid line property of the coordinate plane having linear grid lines in non-transformed state is changed into an arc or a sine curve at a grid line property changer 722 as shown in FIG. 16B, or the positions of the four apexes of the coordinate plane which is a square in non-transformed state are changed to form a desired quadrilateral at an apex position changer 723 as shown in FIG. 16C. These transformation processing sections including the grid density changer 721, the grid line property changer 722 and the apex position changer 723 are connected in that order.

The three types of independent transformation processing section may contain any number of operation formulae, of which one formula and a parameter are set and used. The use of two operation formulae from a type of transformation processing section is prohibited. For example, the transformation for changing the four apex positions of a coordinate plane to those forming a rectangle and to those forming a parallelepiped at the same time is not allowed. When a plurality of types of transformation are involved, as in the present case, the operation of each transformation processing section is required not to affect the operation of the other transformation processing sections. More specifically, the transformation by any operation in the grid line density changer 721 must not affect the positions of the four apexes or the line property of the grid. Also, no transformation by an operation in the grid line property change 722 is required not to change the positions of the four apexes or the grid density. Similarly, even after a transformation by the apex position changer 723, the grid lines are required to remain linear and the intervals of grid lines crossing a grid line to be equidistant.

The three types of transformation processing sections of the present system include an arithmetic operation circuit, each with an operation formula. Assume that the coordinate before transformation is (X, Y) and the one after transformation (X", Y"). The operation formula for the grid density changer 721 is given by equation ① in FIG. 14, the one for the grid line property changer 722 by ② in FIG. 14, and the one for the apex position changer 723 by ③ in FIG. 14, respectively. Each of the above-mentioned three equations has six parameters (pp, p, p0, qq, q, q0), twelve parameters (sa, sb, sc, sd, se, sf, ta, tb, tc, td, te, tf), and six parameters (a, b, c, d, e, f), respectively. The six parameters of the operation formula for the grid line density changer 721 are used to change the degree and center of deflection of grid density along x and y directions of the coordinate plane. The twelve parameters of the operation formula for the grid line property changer 722 are for changing the waviness and the number of lines. The six parameters of the operation formula for the apex position changer 723 change the general shape and size of a character or pattern. The values of these parameters have a limited range so that each of the three formulae may not affect the transformations by the other changers, respectively.

When an operation controller 71 applies a parameter to the operation section 72, a data control section 73 is supplied with an instruction for operation start. The data control section 73 divides the outline data of the data buffer 6 into a code data and a coordinate data, while at the same time producing an ID code and a control code directly. The coordinate data is produced after the operation through the operation section 72. As a result, transformation is effected in a manner similar to a mesh which has been transformed, developed and displayed, and a character set and a pattern set are developed and displayed.

According to the transformation section 7 of the present system, a change in grid line density makes a short character or pattern, a change in grid line property attaches a waviness or the feel of unevenness, and a change in apex position gives rise to the effect of distorting a character or a pattern. Thus the three types of operations are capable of realizing complicated transformations. Unlike the direct transformation of a character or pattern of an irregular shape which requires expression of a transformed shape of the character or pattern by some means, transformation of a coordinate plane which is assumed to be a mesh facilitates instructions in line with an image after transformation.

The transformational operation effected by the operation section 72 of the transformation section 7 is not limited to the above-mentioned example. Instead, to the extent effective for transforming a mesh, any operation may be employed with equal effect. As shown by equation ⑥ in FIG. 14, for instance, an operation formula may be inserted for making four arcuate sides of the outer frame of a mesh, or a conventional affine transformation or projection transformation may be used.

In FIG. 14, the symbol "·" means "x" representing a product. For example, "P·PO" means "P×PO".

Now, explanation will be made about a method of correcting a strain caused when an outline data such as shown in FIGS. 2A, 2B is transformed by the grid line property changer 722.

Figure 17:
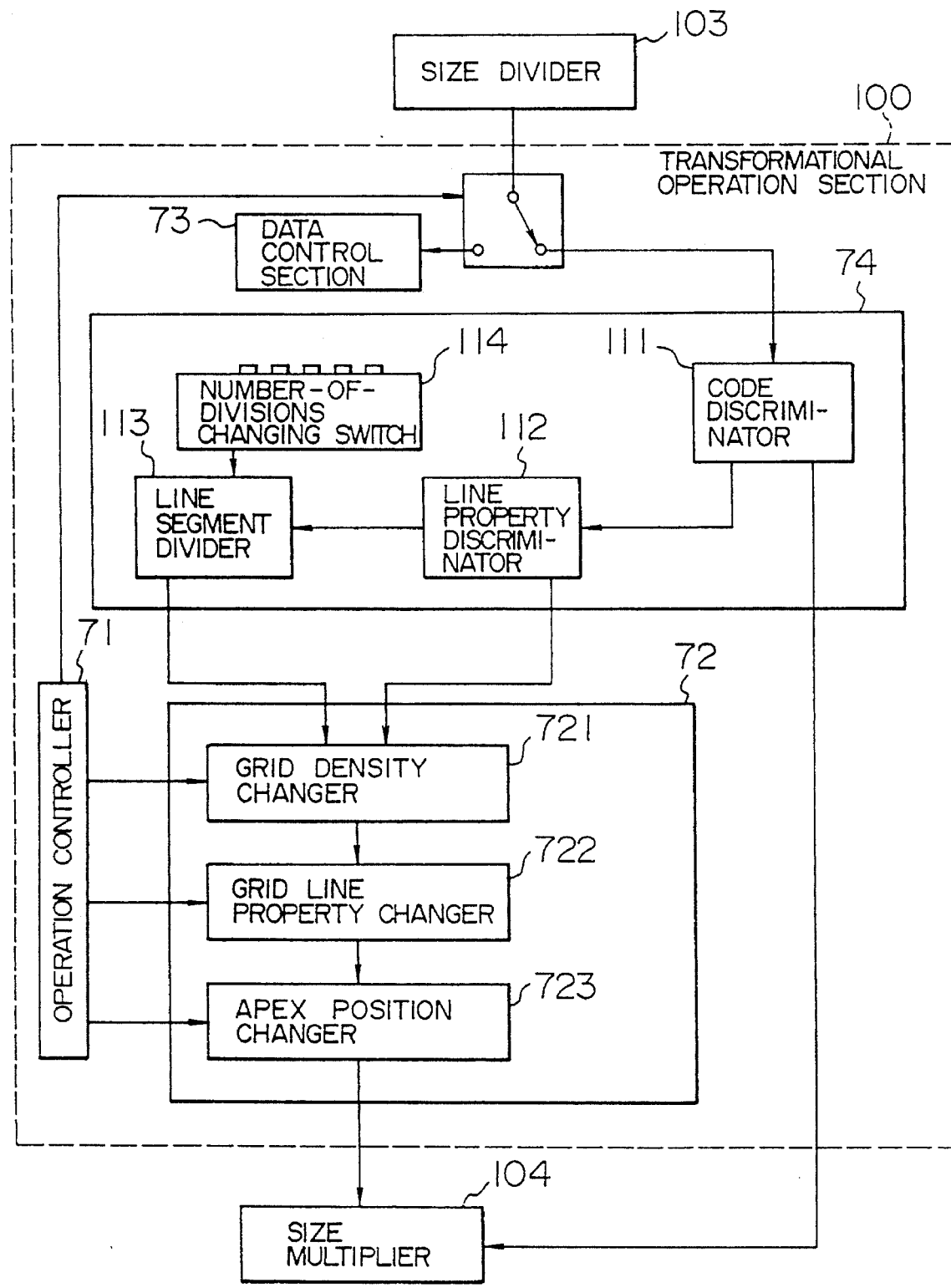
FIG. 17 is a diagram showing the configuration of an interpolation line correcting section.

FIG. 17 is a diagram showing the configuration of an interpolation line correcting section 74. The interpolation line correcting section 74 is for correcting the "disintegration" of a character or a pattern caused by the grid line property changer 722.

The "disintegration" caused by the grid line property changer 722 is a phenomenon in which the pattern contour line "breaks" as shown in FIG. 18 due to the difference in property between the interpolation lines and the transformed grid line in view of the fact that the transformational operation is applied only to the coordinate values of an outline data providing a reference point of the contour line, followed by the development, i.e., the realization of a contour line by interpolating a reference point with a straight line or a curve as in a non-transformed state. This phenomenon often occurs when the grid line property is changed to a curve in an outline data having a portion to be interpolated with a straight line.

The interpolation line correcting section 74 shown in FIG. 17 generates a reference point for subdividing a portion to be interpolated with a straight line into several segments and subjects the reference point thus generated to a transformational operation, thereby to relax the disintegration of the contour line. When the parameter for changing the grid line property of all the parameters supplied from the transformation designating section 5, is not for non-transformation, the operation controller 71 instructs the data control section 73 and the interpolation line correcting section 74 to correct the interpolation line. In the absence of correction, the outline data is discriminated into a coordinate value data and a code data at the data control section 73, so that only the coordinate value data is added to the operation. At the time of correction, on the other hand, the interpolation line correcting section 74 discriminates and corrects the coordinate value data and the code data.

First, a code discriminator 111 sequentially reads the outline data. The code data is outputted directly, while the coordinate data is applied to a line property discriminator 112. The line property discriminator 112 does not correct the coordinate data if it is the one for a reference point of a curve, but applies a curve coordinate data for a curve segment to the operation section 72, thus producing the result of arithmetic operation. In the case where the coordinate data read is providing a reference point of a straight line, on the other hand, a straight line coordinate data for a line segment is supplied to a corrected straight line generating section 113. The corrected straight line generating section 113 divides a line segment generated from a reference point of the straight line into a plurality of segments not longer than a predetermined length, and prepares a coordinate data providing a reference point for generating each of the divided line segments. The resulting coordinate data is supplied to the operation section 72 in place of the reference point coordinate data for the original full line segment thereby to produce a coordinate data subjected to transformational operation. The maximum value of the line segment length is designated by the subdivision number change switch 114, according to the example of outline data transformational operation. According to the example of outline data of the present system, a straight line is a mere arrangement of coordinates providing an ending (starting) point without any code. Coordinates of the subdivision points mentioned above, therefore, are supplied successively to the operation section 72.

Figure 20:
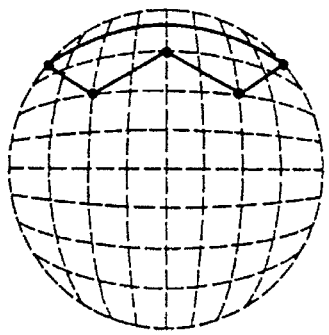
FIG. 20 is a diagram for explaining data after correction.

Take, for example, a pentagonal outline data prepared with five straight lines as shown in FIG. 19A. When the grid line property is changed to such an arcuate form as to form a whole circle without any correction, a coordinate data as shown in FIG. 19B is obtained and the pattern is disintegrated after the arithmetic operation. When the above-mentioned correction is effected with a line segment not longer than 0.125, by contrast, the outline data outputted from the transformation section 7 provides a transformation as expected as shown in FIG. 20.

Figure 21:
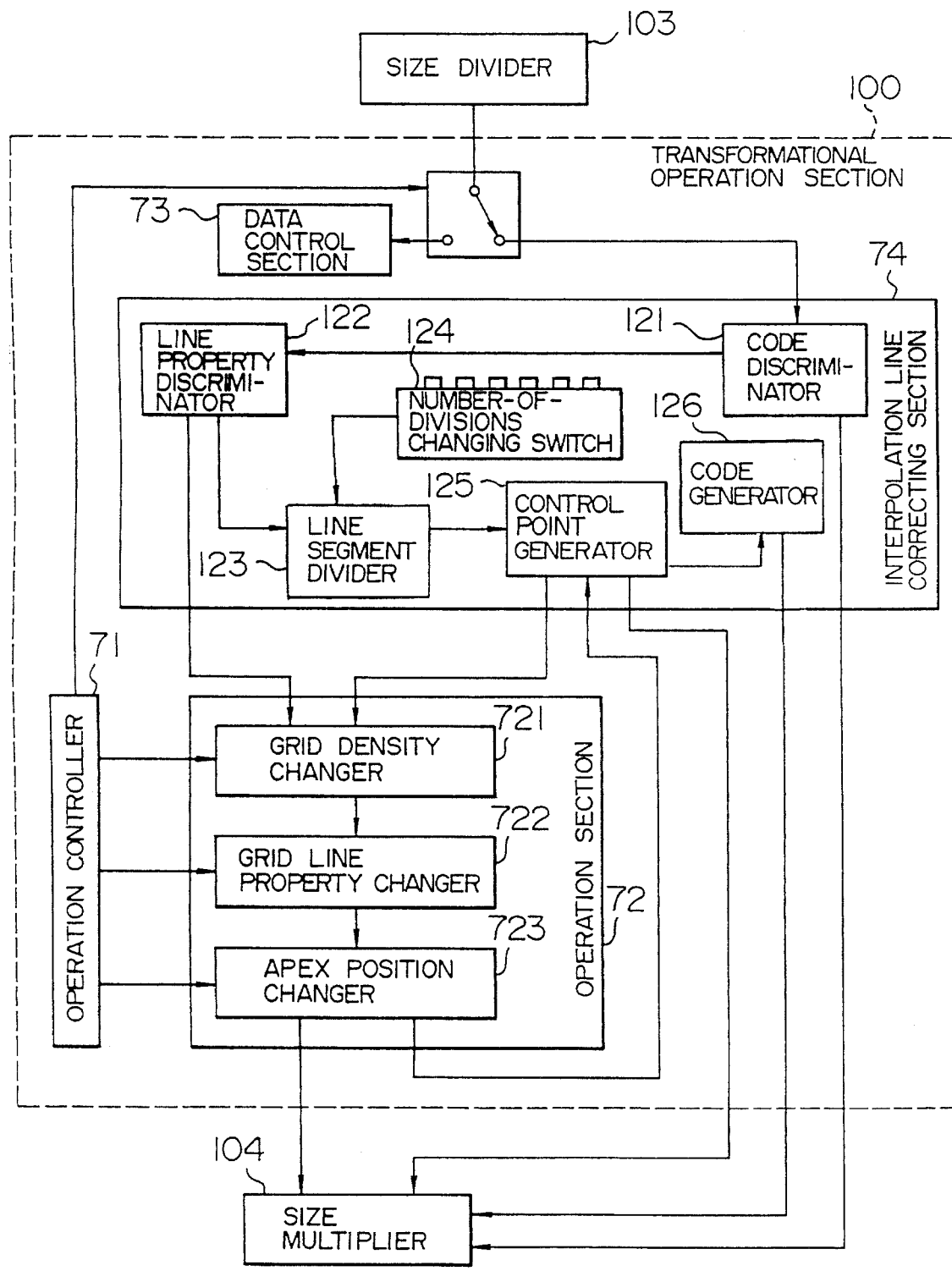
FIG. 21 is a diagram showing the configuration of an interpolation line correcting section.

FIG. 21 shows another example of the interpolation line correcting section 74. This interpolation line correcting section 74 prevents the disintegration of a contour line by changing a straight line portion into a curve. In the example under consideration, the contour line of a curved portion is a Bezier curve, and therefore the straight line portion is replaced by a Bezier curve to assure coincidence between outline data formats before and after transformation.

First, as in the preceding embodiment, a code discriminator 121 decides whether a coordinate value data or a code data is involved. A code data is outputted directly, while a coordinate data is applied to a line property discriminator 122. If a coordinate data of a reference point of a curve is involved, it is supplied to the operation section 72 as in the preceding embodiment by the line property discriminator 122. A straight line coordinate data, on the other hand, is sent to a line segment subdivider 123. The line segment subdivider 123 divides a straight line into several segments in preparation for replacing the received straight line coordinate data with a plurality of curves. The number of subdivisions may be changed by a division number change switch 124. No subdivision is required when one curve segment is generated from a straight line. When one curve segment is generated from a straight line, if a data of a Bezier curve segment is involved according to the present system, a curve code and coordinates of two control points are required in addition to the ending and starting points of the curve. Therefore, control points are generated and added to a code data. A control point generating section 125 calculates two control points with the ending and starting points of a straight line segment as those of a curve segment. A code generating section 126 produces the coordinate data of the two control points and the ending point after a code of a curve.

Figure 22:
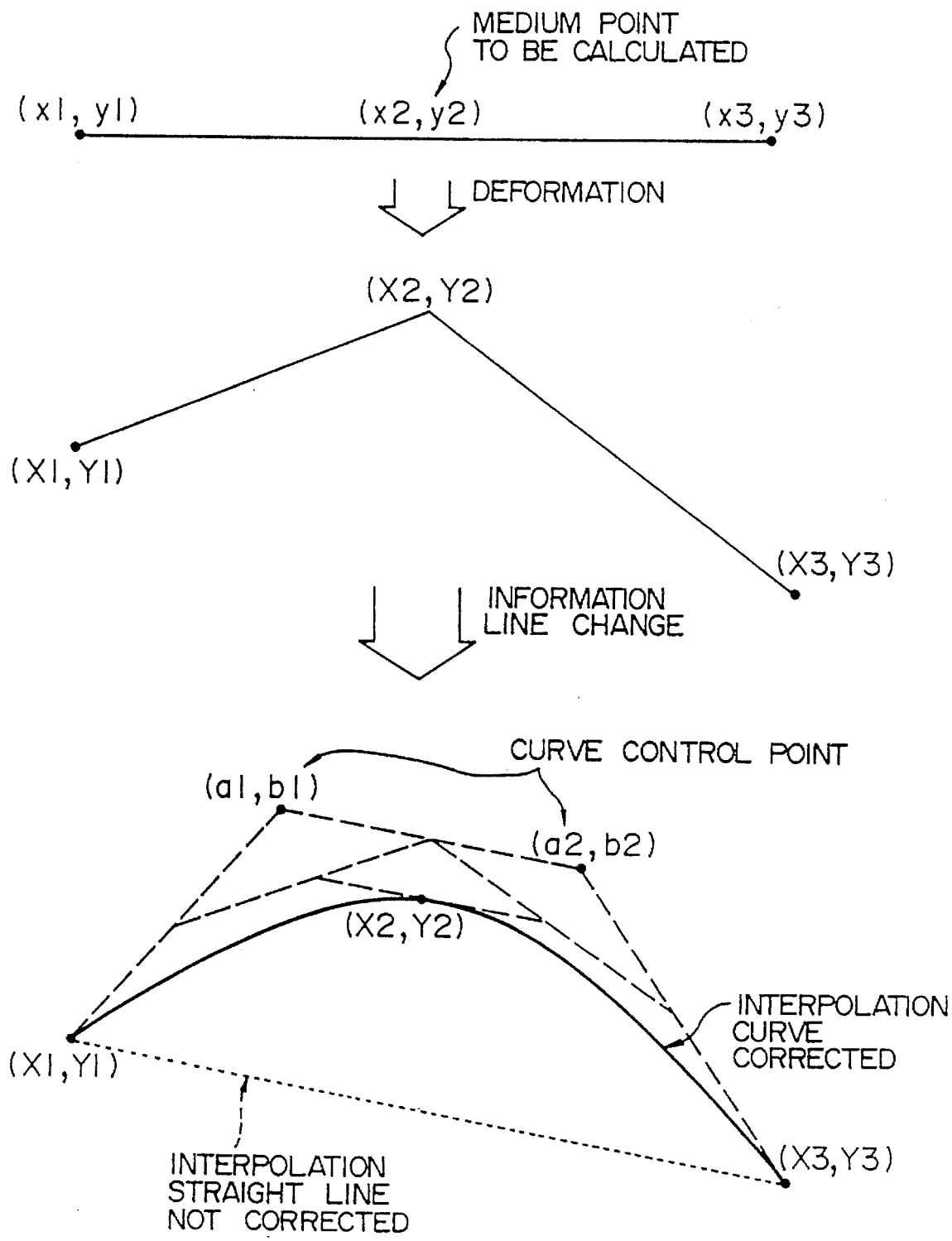
FIG. 22 is a diagram for explaining a method of curve generation.

Control points are calculated variously. In an example shown in FIG. 22, the coordinate of the destination of a straight line segment with the central point thereof relocated by transformation may be determined in such a manner as to be passed by a curve. Specifically, assuming that the starting and ending points of a straight line segment are (x1, y1), (x3, y3), the central point (x2, y2) thereof is determined, and the coordinate points (x1, y1), (x3, y3), (x2, y2) after transformation are calculated through the operation section 72. From the result of this operation, control points (a1, b1), (a2, b2) are calculated. Calculation formulae are given as equations ④ and ⑤ in FIG. 15.

Figure 23:
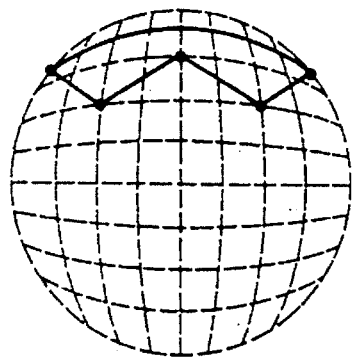
FIG. 23 is a diagram for explaining data after correction.

In the outline data according to this example, the ending point coordinate of a given line segment provides the starting point of the next line segment, and the two points following a curve designating code give curve control points. Thus, a curve designating code is followed by the production of (a1, b1), (a2, b2), further followed by the production of the result of calculating (x3, y3) of the ending point (and the starting point of the next line segment) at the operation section 72. This process is repeated to replace a straight line with a curve. In the example shown in FIG. 19, the interpolation line correcting section 74 in FIG. 21 prepares a transformed outline data as shown in FIG. 23 and obviates the disintegration of a closed curve. When a complicated transformation is involved, mere replacement of a straight line with a curve may not prevent disintegration. In such a case, each line segment obtained by subdivision at the line segment subdivider 123 is replaced with a plurality of curve segments as in the preceding case.

The result of correcting the disintegrated characters shown in FIG. 18 by the interpolation line correcting section 74 in FIGS. 17 and 21 is shown in FIGS. 24A and 24B, respectively. It will be seen that an effect is obtained as expected in both cases.

The embodiments described above mainly concern a case in which a transformation region is determined automatically by selecting a character set or a pattern set to be transformed. Alternatively, the transformed shape of each character or pattern can be changed by changing a transformation region for the same character set or pattern set if the user designates the transformation region, as shown in FIG. 9. In such a case, however, the user is required to designate a transformation region as a rectangle.

In the example shown in FIG. 9, for transforming a character set "TEST", a square region with the character set "TEST" located on the upper side is used as a transformation region. If transformation is effected to produce a circular transformation region, a local transformation effect is obtained with an expanded side.

Figure 10:
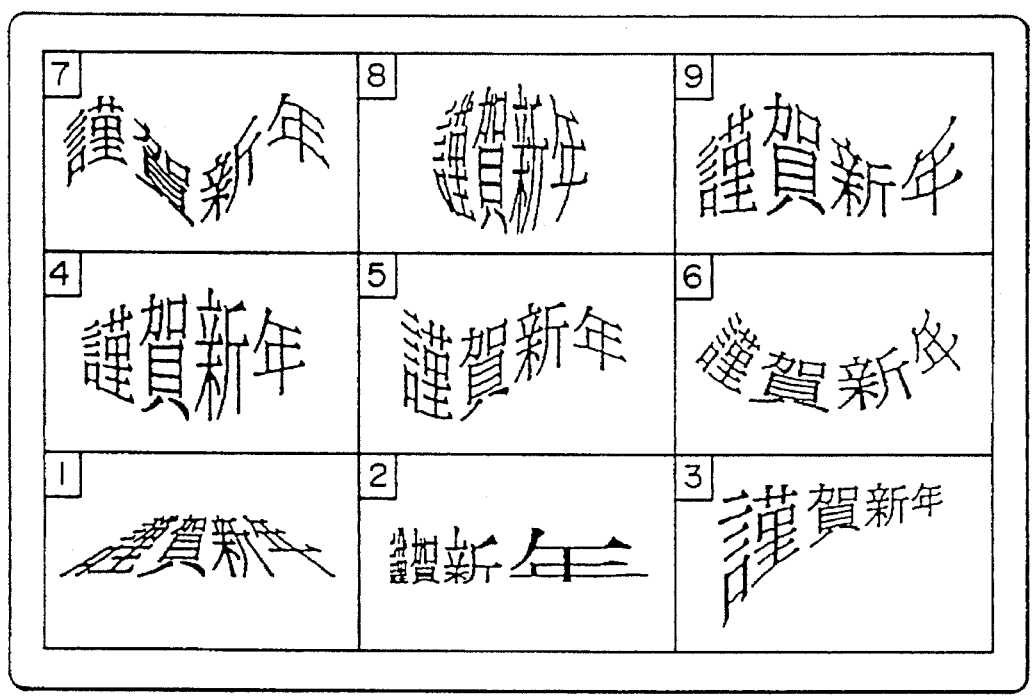
FIG. 10 is a diagram for explaining an example of a transformed shape selection menu.

Apart from the above-mentioned embodiments in which a list of mesh transformation examples is used as a transformed shape selecting menu, transformed character sets as shown in FIG. 10 may directly provide a transformed shape selecting menu.

In the case where an object of transformation is a character, on the other hand, the region setting section 12 of the system may be set for the size of a single character, and each character transformed into the same shape as shown in FIGS. 24A and 24B to change the style to a round character.

Unlike in the aforementioned embodiments in which a transformed shape is selected from a transformed shape selecting menu, the user may designate a transformed shape. More specifically, the user is instructed to relocate apex positions or the like of a non-transformed mesh to prepare a transformed mesh, and by calculating a parameter inversely for a coordinate relocation operation formula from the apex positions or the like of the transformed mesh, a character set or a pattern set is transformed.

The designation of a transformed shape is effected at the transformation designating section 5. First, the user selects and enters a transformation type from an input section 1. There are three transformation types including grid density, grid line property and apex position. This step is followed by designating the manner and degree of transformation with the selected transformation type.

Figure 11:
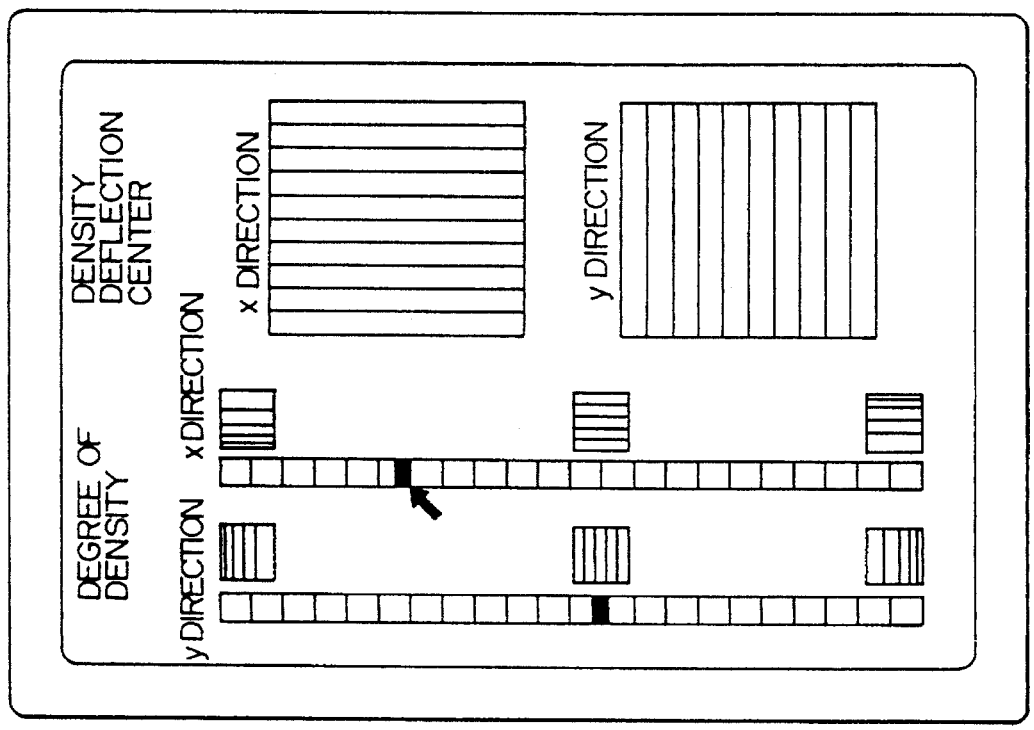
FIG. 11 is a diagram for explaining an example of a display screen for designating the change of grid density.

More specifically, in the case of grid density, for example, the coordination relocating operation by equation ① in FIG. 14 has the effect of deflecting grid intervals toward a given grid line along x and y directions. The grid line providing a deflection center and the degree of deflection are processed on the display screen as shown in FIG. 11 by the user in such a manner that a mesh grid line on display providing a deflection center along x and y directions is designated, together with the degree of density or coarseness of grid lines toward the particular grid line designated as a center.

Figure 12:
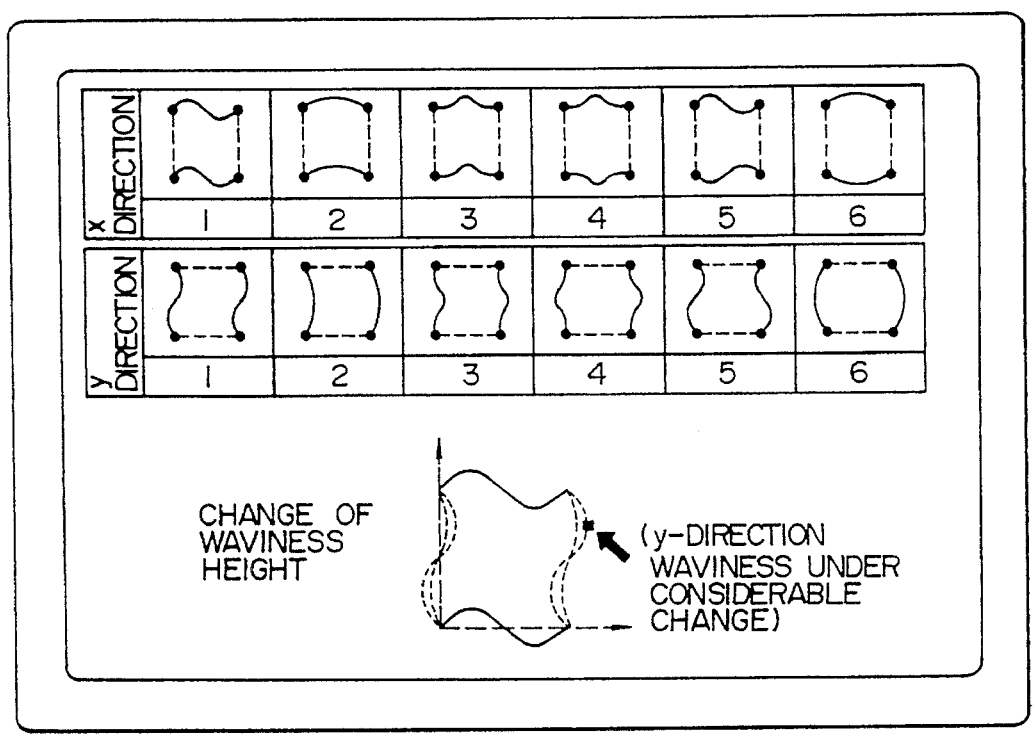
FIG. 12 is a diagram for explaining an example of a display screen for designating the change of grid line quality.

In the case of grid line property, on the other hand, the coordinate relocating operation with equation ② of FIG. 14 causes a waviness of grid lines. In view of this, the user selects a waviness of lines along x and y directions and designates the magnitude of wariness on the display screen as shown in FIG. 12.

Figure 13:
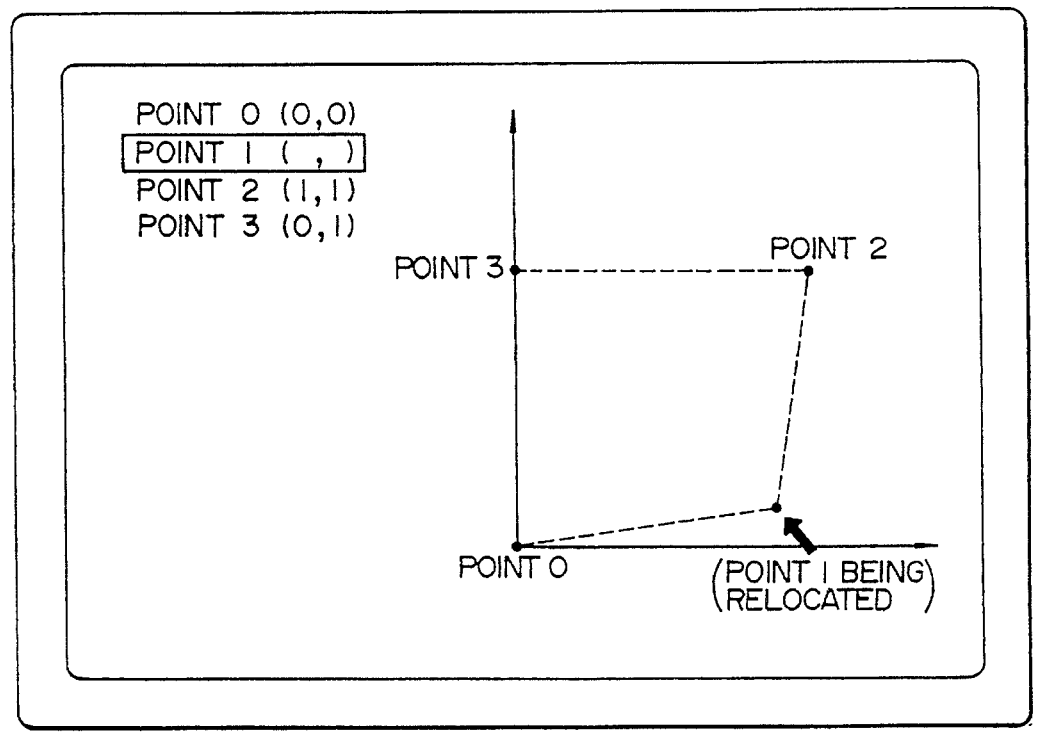
FIG. 13 is a diagram for explaining an example of a display screen for designating the change of apex position.

Further, with regard to apex positions, the coordinate relocating operation with equation ③ in FIG. 14 has the effect of relocating the four apex positions of a mesh in the transformation region. Therefore, the user relocates the apex positions into a desired shape on the display screen as shown in FIG. 13.

The transformation designating section 5, in accordance with the transformation type designated by the user and the transformation method entered, inversely calculates a parameter for a coordinate relocating operation formula and outputs it to the transformation section 7. More specifically, the grid number of a grid line providing a deflection center designated for grid density is converted into p0 and q0, and the deflection degree into p and q, thereby calculating the values of pp and qq. In the case of grid line property, each parameter for each waviness is collated with a stored conversion matrix, and sa, sb, sc, sd, se, sf, ta, tb, tc, td, te, tf are read with the magnitude of waviness reflected therein. In the case of apex position, on the other hand, a parameter is calculated by a calculation formula. Assuming that apexes (1, 0), (1, 1), (0, 1) are relocated to (x1, y1), (x2, y2), (x3, y3) after transformation (if a square is to be transformed into a quadrilateral without relocation, the positions of only three apexes are changed without relocating the origin), calculation formulae for parameters of apex positions are given as a=x1, b=x2−x1−x3, c=x3, d=y1, e=y2−y1−y3, f=y3. If the origin (0, 0) is changed to (x0, y0) at the same time, it follows that the whole pattern to be transformed is relocated with the transformation region. In that case, a transformed pattern is displayed at a position obtained by adding the coverage (x0, y0) of the origin to the display position of each pattern to be transformed. Transformation operation parameters in this case are given as $a=x1-x0$, $b=x2-x1-x3+x0$, $c=x3-x0$, $d=y1-y0$, $e=y2-y1-y3+y0$, $f=y3-y0$.

By preparing a user interface as mentioned above, the user is capable of designating a desired transformed shape with considerable freedom.

Figure 25:
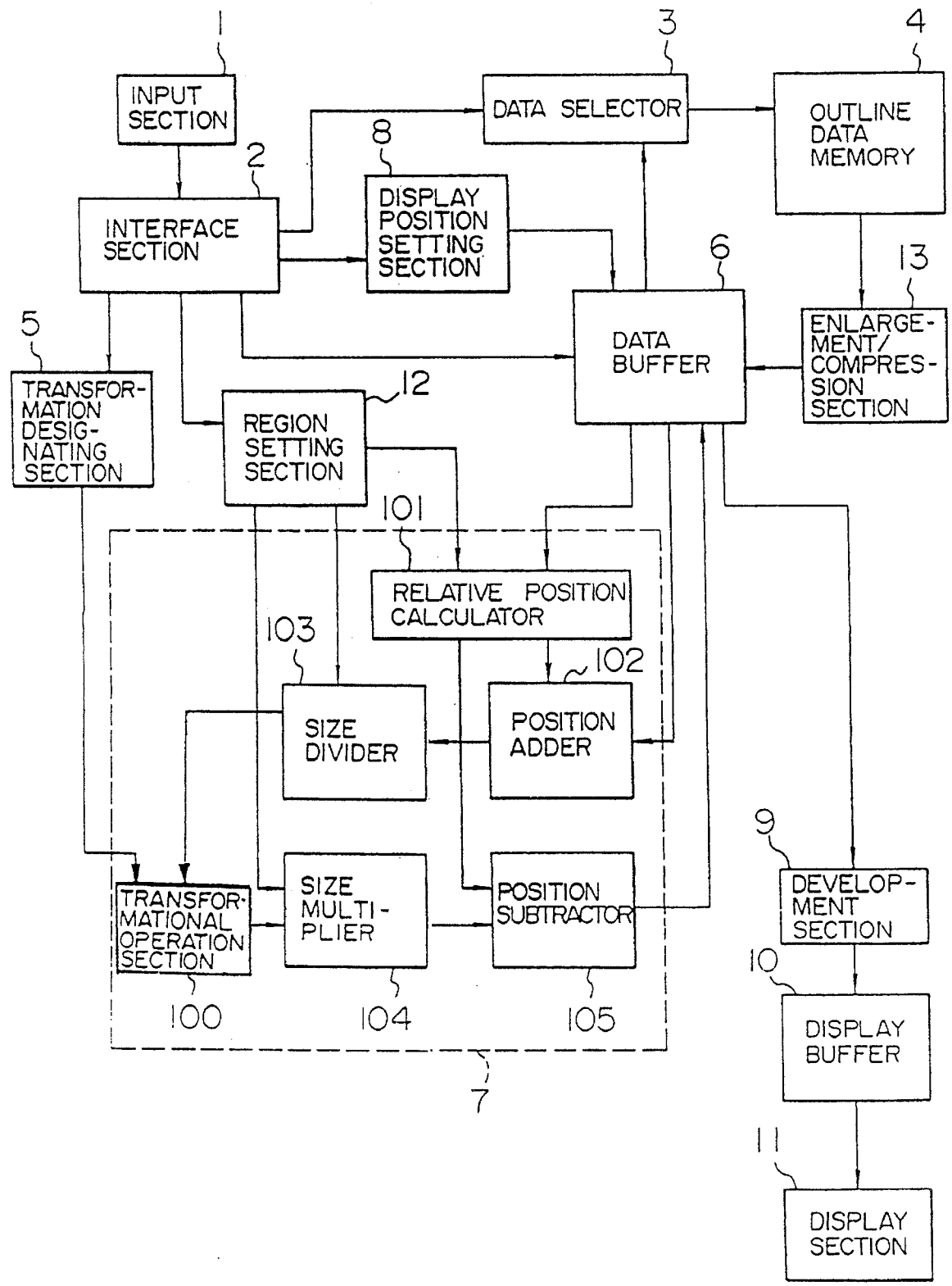
FIG. 25 is a diagram showing the configuration of a character and pattern transformation processing system according to another embodiment of the present invention.

Further, if a column for storing a pattern outline data to be displayed is added to the display data table of the data buffer 6 and the outline data stored in the data buffer 6 but not the data read from the outline data memory 4 is transformed at the transformation section 7 as shown in FIG. 25, then a pattern or a character can be transformed any number of times repeatedly.

Figure 26:
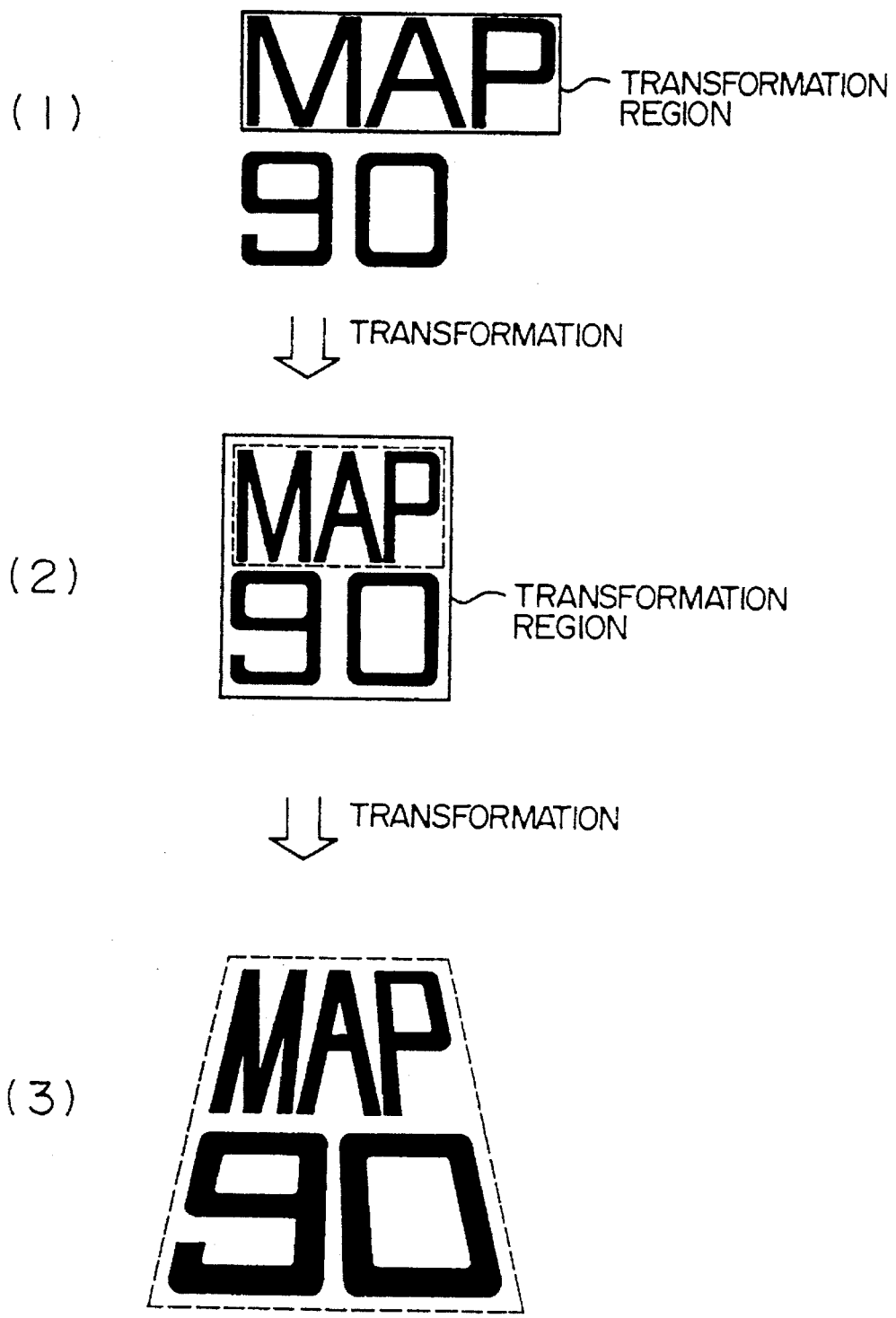
FIG. 26 is a diagram for explaining an example of transformation effect according to another embodiment.

In FIG. 26, for example, assume that two lines of character set are displayed as shown in (1) in the first place. The data buffer 6 in FIG. 25 has stored therein an outline data read from the outline data memory 4 enlarged/compressed at the enlargement/compression section 13. Under this condition, a transformation region surrounding the upper three characters is set and an instruction is given to transform them to the same width as the lower two characters. The outline data corresponding to the three characters "MAP" stored in the data buffer 6 is processed at the transformation section 7 and outputted, and is rewritten into an outline data before transformation of the data buffer 6. Upon rewriting of the outline data, the development section 9 develops the data, and the display section 11 displays it as shown in (2) of FIG. 26. As the next step, the transformation region is set anew in a manner to surround the five characters in two lines, and an instruction is given to attain Transformation 1 in FIG. 7. A similar process is repeated for display as shown in (3) of FIG. 26.

In this way, a character set or a pattern set can be transformed by setting a transformation region for any arrangement of a character set or a pattern set to be transformed. In other words, even when character coordinate planes are arranged in superposition by kerning or cover any number of lines, any number of transformations is possible by selecting a given pattern set on a screen with illustration patterns dotted around such a character set.

An improvement embodying the present invention will be explained below.

Figure 28:
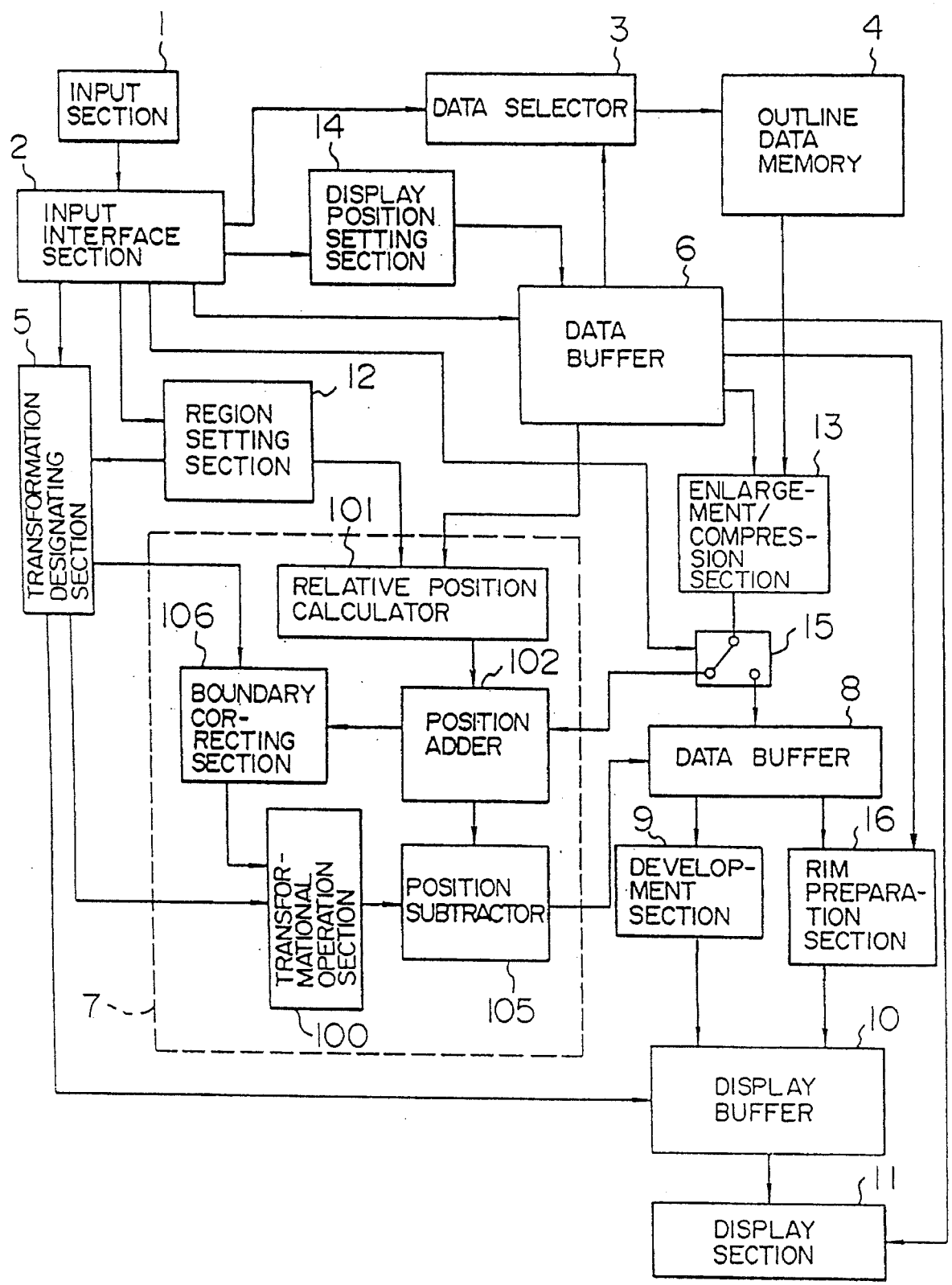
FIG. 28 is a diagram showing the configuration of a system according to an embodiment of the present invention.

A block diagram of a system according to an embodiment of the present invention is shown in FIG. 28. This system comprises an input section 1 for transmitting an instruction from the user, an input interface section 2 for sending a control signal to each unit of the system in accordance with an instruction from the input section 1, a data selector 3 for searching and reading a pattern data or a character data stored in the data memory 4 in accordance with an instruction from the input section, a data buffer 6 for storing display information of characters or patterns displayed on a display unit, a transformation designating section 5 for designating a parameter for processing a pattern or a character into a shape designated by the user, a transformation section 7 for processing the pattern or character data by receiving a parameter set as above, a data buffer 8 for storing the data thus processed, a region setting section 12 for setting a region of a range within which characters and patterns are to be processed one at a time, an enlargement/compression section 13 for regulating the size of a character or a pattern displayed, a display position setting section 14 for automatically setting the position of a pattern to be displayed, a rim preparation section 16 for generating a frame data of a character or a pattern processed, a development section 9 for developing a dot data on the display buffer 10 of a bit map memory or the like for displaying a character or pattern data and a frame data, and a display section 11 for displaying a data on the display buffer 10. The transformation section 7 includes a transformational operation section 100, a relative position calculator 101, a position adder 102, a position subtractor 105 and a boundary corrector 106.

An example of the character and pattern data stored in the data memory 4 shown in FIG. 28 will be described with reference to FIG. 2. By way of explanation, a shape is assumed to be defined by an arrangement of representative points on a pattern contour line and a data of vectorial display type is used. A character data normally called the "outline font" is used. The data shown in FIG. 2 is such that a pattern contour line is divided into a straight line portion and a curve portion, and the straight line is given by an arrangement of terminating points while a curve portion is expressed by edge points and two control points for approximating a three-dimensional curve. When displaying on a display unit, the data of FIG. 2 is developed, a dot data of a pattern contour line is restored on a bit map memory or the like, and the data is "painted out" as required to restore the visual information of a pattern or a character. Nevertheless, the present invention does not deal with a storage system or a method of development of a character or a pattern, and the data configuration thereof is not limited to the example shown above. Also, a pattern data of a type for a data memory as shown in FIG. 2, for example, will hereinafter be called an outline data, and a pattern display information developed into a pattern shape on a bit map memory or the line as a dot data.

Figure 29A:
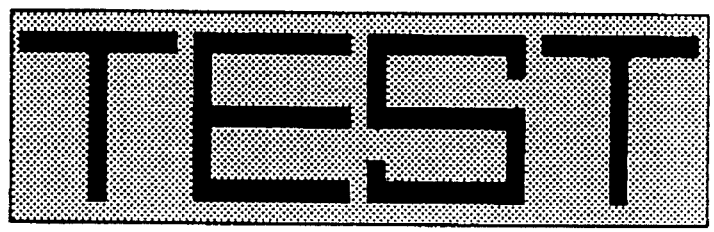
FIGS. 29A, 29B and 29C show examples of character and pattern transformation by the system shown in FIG. 28, and a conventional system.
Figure 29B:
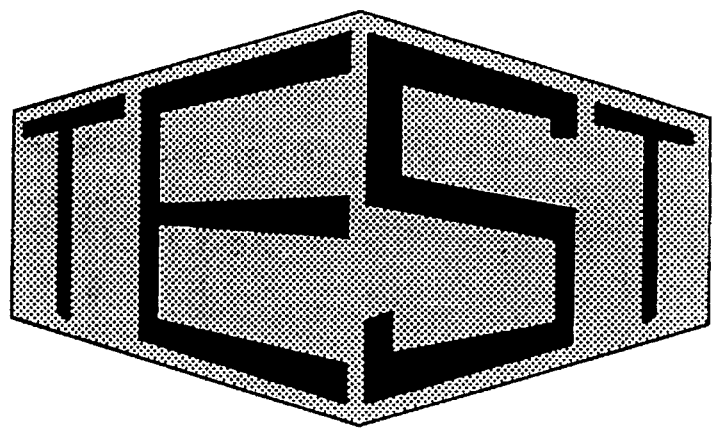

FIG. 29A shows an example of character set and background pattern prepared by a conventional system. According to the system of the present invention, FIG. 29A can be transformed in various ways as shown in FIG. 29b, and the background pattern of FIG. 29C can be displayed in easily visible fashion even when the background has a figure. Now, explanation will be made about the operation of the present system with reference to a case of displaying the characters and patterns shown in FIGS. 29B and 29C. First, when it is desired to display a pattern as shown in FIG. 29A, the user enters a desired character or pattern name, display the position, size, color and other display information required for display on a display unit by way of the input section 1. An ID code and display information are stored in a display data table as shown in FIG. 30 of a data buffer 6. Normally, the size and display position are entered each time the pattern or illustration is displayed. At the time of preparing a considerable amount of documents, however, the display position setting section 14 sets a display position by automatically adjusting the lateral or longitudinal writing, character intervals, line space, etc., in accordance with the user's instruction. Upon entry of a data into the display data table, the data selector 3 reads an outline data as shown in FIG. 2 of a pattern and a character to be displayed from a data memory 4. The character and pattern data thus read is transformed into a user-designated size at the enlargement/compression section 13, and is applied to the data buffer 8. The development section 9 plots a pattern contour line on the display buffer 10 in accordance with the coordinate point train information of the data buffer 8, and by "painting out", develops the pattern and character data shown in FIG. 2 into a dot data for display. The dot data thus developed has a transferred character and pattern displayed at the display position on the display screen of the display section 11. The background rectangle, and "T", "E", "S", "T" are entered sequentially by designation of the size, color and display position. Upon preparation of a display data table as shown in FIG. 30, FIG. 20A is displayed.

Figure 32A:
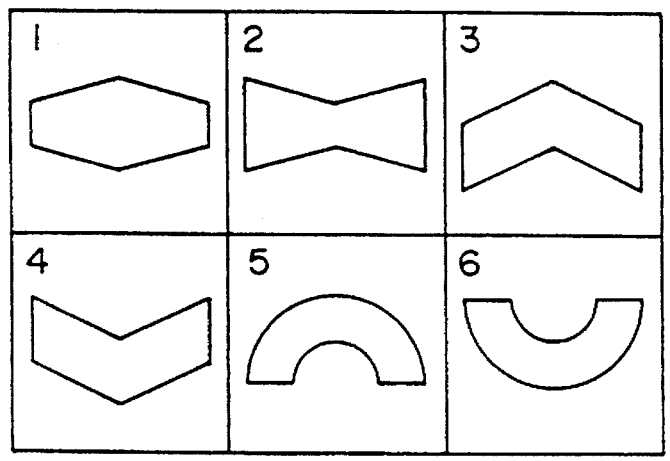
FIGS. 32A and 32B show an example of a transformation menu of mesh for selecting a transformed shape used in the system shown in FIG. 31.
Figure 32B:
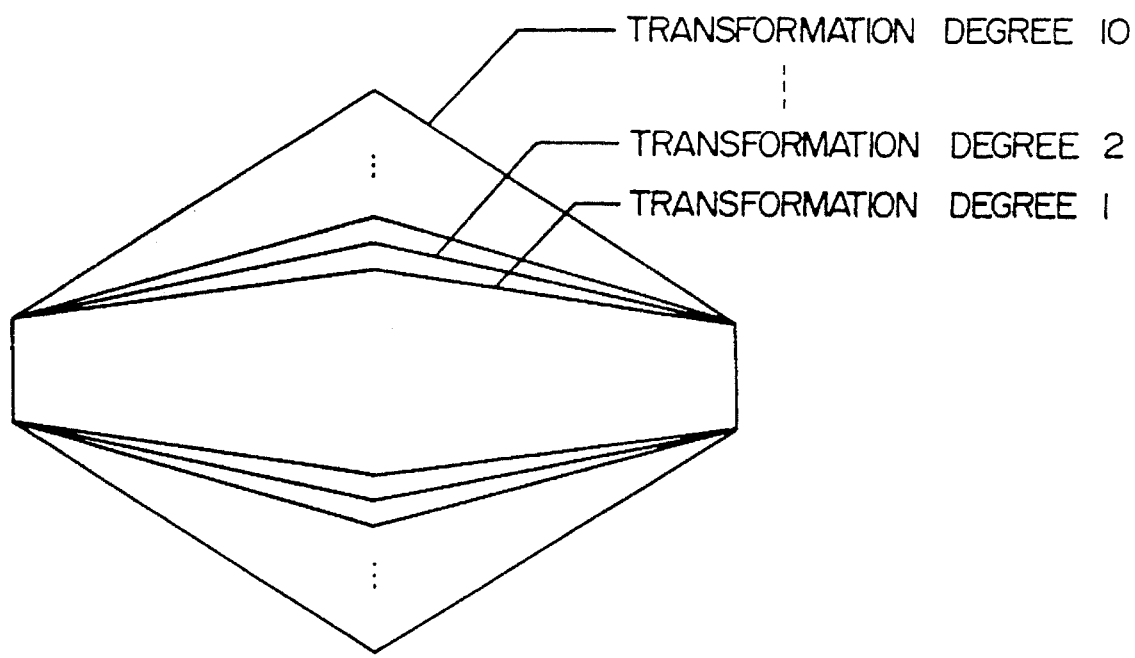

If a display pattern is to be transformed as shown in FIG. 29B, the one desired characters or patterns on display is selected and entered by way of the input section 1. A transformation attribute is registered with the pattern data selected in the display data table. When a plurality of characters or patterns are selected, the size and position of a transformation region containing the particular patterns or characters are calculated and stored in a region processing section 12. When a single pattern is selected, on the other hand, the size and display position of the pattern directly provides a transformation region. In the above-mentioned case, the background rectangle and the four characters "TEST" are designated by surrounding the characters with a rectangle. As an alternative, patterns may be designated as an object of transformation one by one. The manner in which a character or pattern selected is to be transformed is designated by the transformation designating section 5 which is shown in detail in FIG. 31. The menu display section 55 in the transformation designating section 5 displays a transformed shape menu as shown in FIG. 32A on the display screen. The user selects one shape pattern from the menu and enters the transformation degree for the particular pattern. In other words, according to the present system, when the transformation pattern 1 is selected in FIG. 32A, for example, the transformation degree, which is available in ten stages as shown in FIG. 32B, is selected by way of numerical keys of the keyboard in the input section 1. Alternatively, the "+ key" of the keyboard may continue to be struck upward from the minimum transformation degree to select a most proper transformation degree. Thus the desired transformation can be designated by the starting transformation degree and the number of times the "+ key" and — key" are struck. The transformation designation controller 51 is for receiving the shape and transformation degree selected by the user, reading the parameter calculation formula of the transformation parameter calculator 56 in accordance with the selected shape, and calculating and sending to the transformation section 7 the parameter to be set in the coordinate relocation operation circuit of the transformation operation section 100 on the basis of the transformation degree and the size of the transformation region received from the region setting section 12. Further, the transformation designation controller 51 has the boundary parameter calculator 57 calculate the edge points of a transformation boundary line, and sets them by sending to the boundary corrector 106 of the transformation section 7. More specifically, the system according to the present invention realizes a transformation by subjecting an outline data to a coordinate relocation operation, and therefore the transformation designating section 5 sets the transformation section 7 in such a manner as to effect a numerical operation corresponding to the desired transformed shape.

Figure 33A:
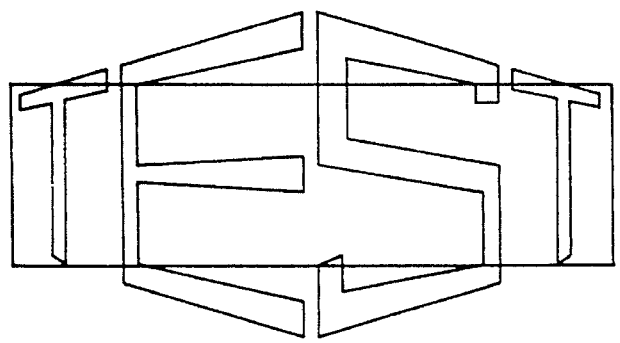
FIGS. 33A and 33B show a conventional system and an example of pattern and character transformation by the system shown in FIG. 28.
Figure 33B:
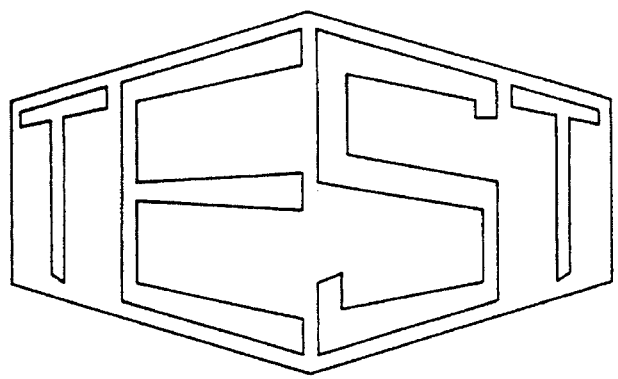
Figure 34:
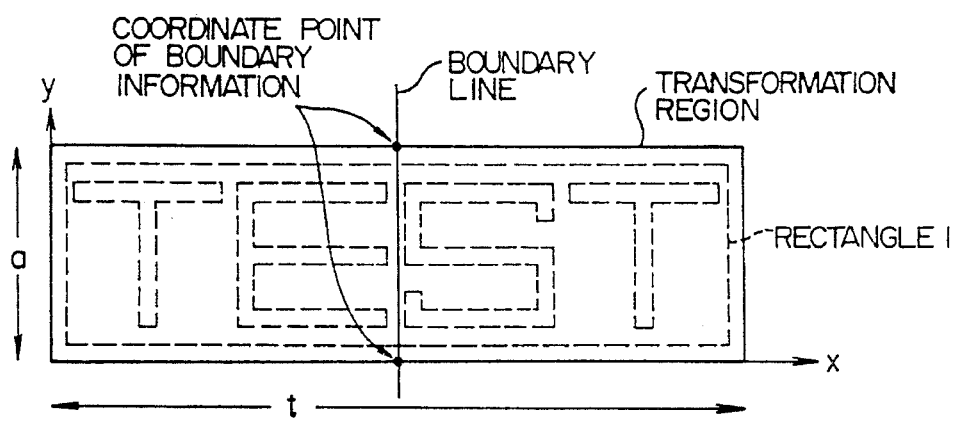
FIG. 34 is a diagram for explaining a boundary line.
Figure 35A:
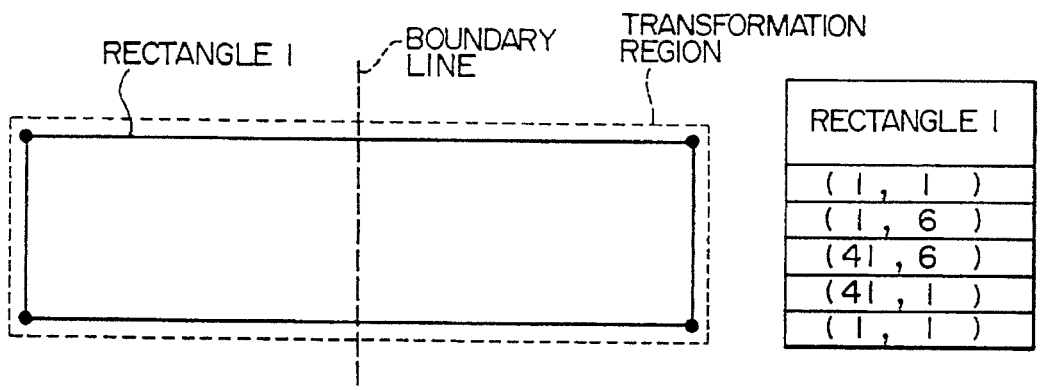
FIGS. 35A, 35B and 35C are diagrams for explaining the operation of a boundary correcting section 106 shown in FIG. 28.
Figure 35B:
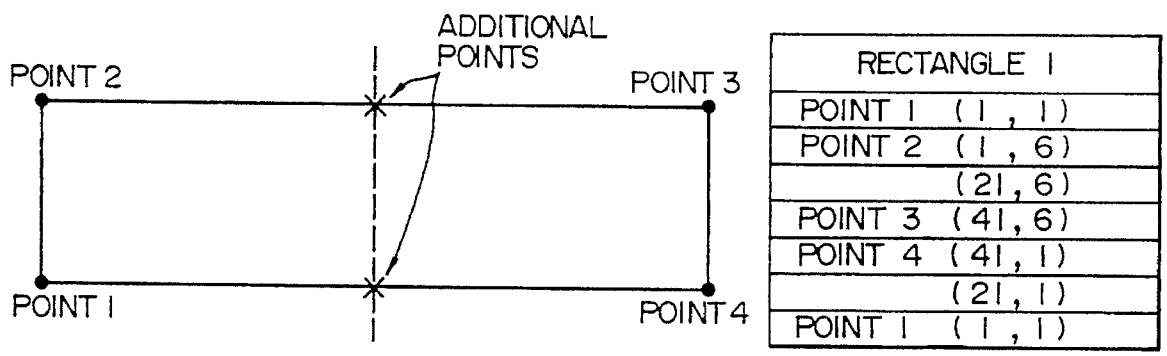
Figure 35C:
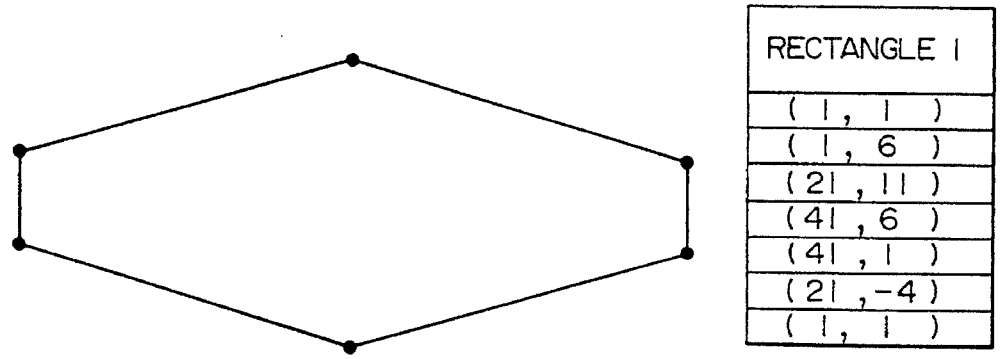
Figure 36A:
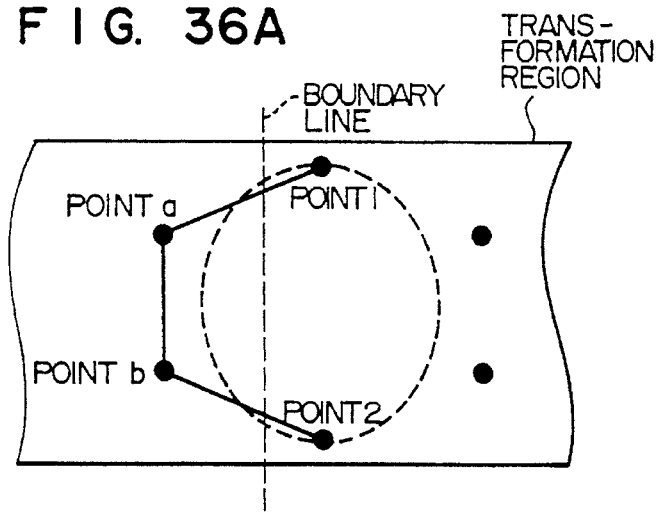
FIGS. 36A, 36B and 36C are diagrams for explaining the operation of a boundary correcting section 106 shown in FIG. 28.
Figure 36B:
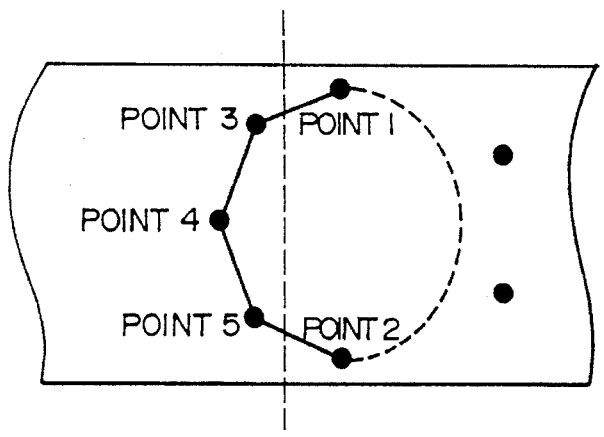
Figure 36C:
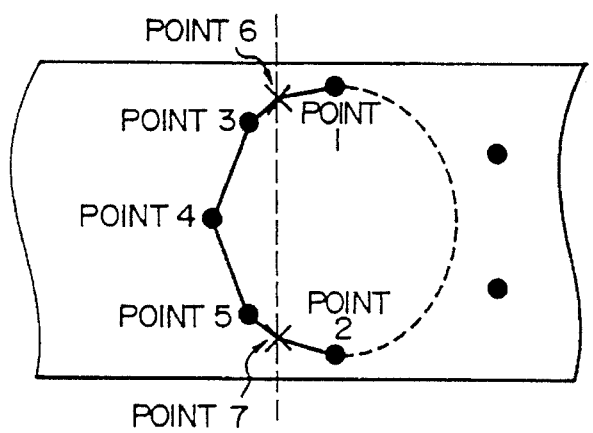

Once a transformation region and a transformed shape are determined, the transformation section 7 subjects each pattern to a region-related processing to permit an object pattern to be transformed in accordance with the portion occupied thereby in a transformation region. First, data on characters and patterns designated for transformation are sequentially read from the data memory 4 by the data selector 3, and applied to the position adder 102 of the transformation section 7 through the enlargement/compression section 13. The relative position calculator 101 of the transformation section 7, on the other hand, calculates the position of each pattern or character to be transformed as relative to the transformation region on the basis of the data in the display data table and the transformation region. The outline data of the characters and patterns to be transformed are added to the relative position thus calculated at the position adder 102. As a result of this processing, the pattern to be transformed defined on each coordinate plane is numerically incorporated as a part of the transformation region. After that, only in the case of transformation with a boundary, the boundary correcting section 106 calculates a singular point coordinate on the boundary line, and adds it to the outline data subjected to region-related processing. The "transformation with a boundary" means, for instance, the one having a corner or displacement in the pattern as shown in FIG. 32A. An outline data is expressed by an arrangement of representative coordinate points on a pattern contour line. Even when only the representative coordinate points are relocated in the coordinate and transformed, therefore, the boundary of a corner or displacement may sometimes be lacking after development of a contour line. In the case of FIG. 29A, for example, transformation without correcting the boundary line fails to lead to a desired shape since the background rectangle is comprised of representative coordinates of four straight lines as shown in FIG. 33A. As a result, the coordinate of the intersection between the boundary line and the pattern contour line is calculated and added to the outline data to make the indication of corners and displacements as shown in FIG. 33B possible. According to the present system, as shown in FIG. 34, the boundary line information is supplied as the coordinates of two edge points where the line segment crosses the transformation region rectangle. The positions of the two edge points are determined specifically by the transformed shape, and calculated by the boundary parameter calculator 57 and set in the boundary correcting section 106 at the time of selecting a transformed shape at the transformation designating section 5. The boundary correcting section 106 decides whether the pattern to be transformed is superposed on the straight line passing the two points. If it is not superposed, the data is sent directly to the transformation operation section 100. While if it is superposed, a line segment crossing the boundary line is determined from the coordinates of the dot train, while adding the coordinate of the intersection between the line segment and the boundary straight line as a new coordinate data. In the transformation menu of FIG. 32A, for instance, transformations 1, 2, 3, 4 are all shaped bent at the center in symmetric form. Assuming that the size of the transformation region (x direction×y direction) is (t×s), therefore, the boundary line information is given by two points (t/2, 0) and (t/2, s). FIGS. 35A to 35C show a method of correcting the region. In the case shown in FIG. 34, the size t×s of the transformation region is 42×12. The two coordinate points in the boundary line information, therefore, are (21, 0) and (21, 12). In this example, "T", "E", "S", "T" are not located on the boundary line. Since the boundary line is overlaid on the background rectangle, however, the rectangle outline data is processed at the boundary correcting section 106. FIGS. 35A to 35C show the manner of adding the coordinate data of the background rectangle. FIG. 35A is for a rectangle data after the region-related processing. The rectangle includes five coordinate data representing four line segments. First, the line segment from the starting point (1, 1) to the second point (1, 11) providing edge points does not cross the boundary line and therefore is added directly between the two points as a new coordinate point data. The line segment between the second point and the third point (41, 11) crosses the boundary line, so that an intersection (21, 11) is added between the above-mentioned two new points. In similar fashion, a coordinate (21, 1) of the intersection with the boundary line is added between the fourth point (41, 11) and the fifth or ending point (1, 1), thus rewriting an outline data as shown in FIG. 35B. Transformation by coordinate relocation after correction in this way can attain a desired shape as shown in FIG. 35C. Also, in the case where a curve is used in the outline data as in the present system, a curve data is changed to a straight line data before the above-mentioned processing. When a tertiary Bezier curve segment represented by points, 1, a, b, 2 is located on the boundary line as shown in FIG. 36A, for instance, a line segment with edge points at 1 and a and a line segment with edge points at b and 2 cross the boundary line. Thus it is seen that the curve is required to be corrected by being divided. According to the present system using a tertiary curve, one curve is approximated by at least four straight lines. More specifically, as shown in FIG. 36B, points 3, 4, 5 are calculated, and replaced with the points a and b as the Bezier curve control points, with the curve code data removed. After that, as shown in FIG. 36C, the intersection of each straight line segment obtained by division with the boundary line is determined in similar manner and is added to the outline data. In this way, a curve portion can also be corrected in terms of region.

Figure 37:
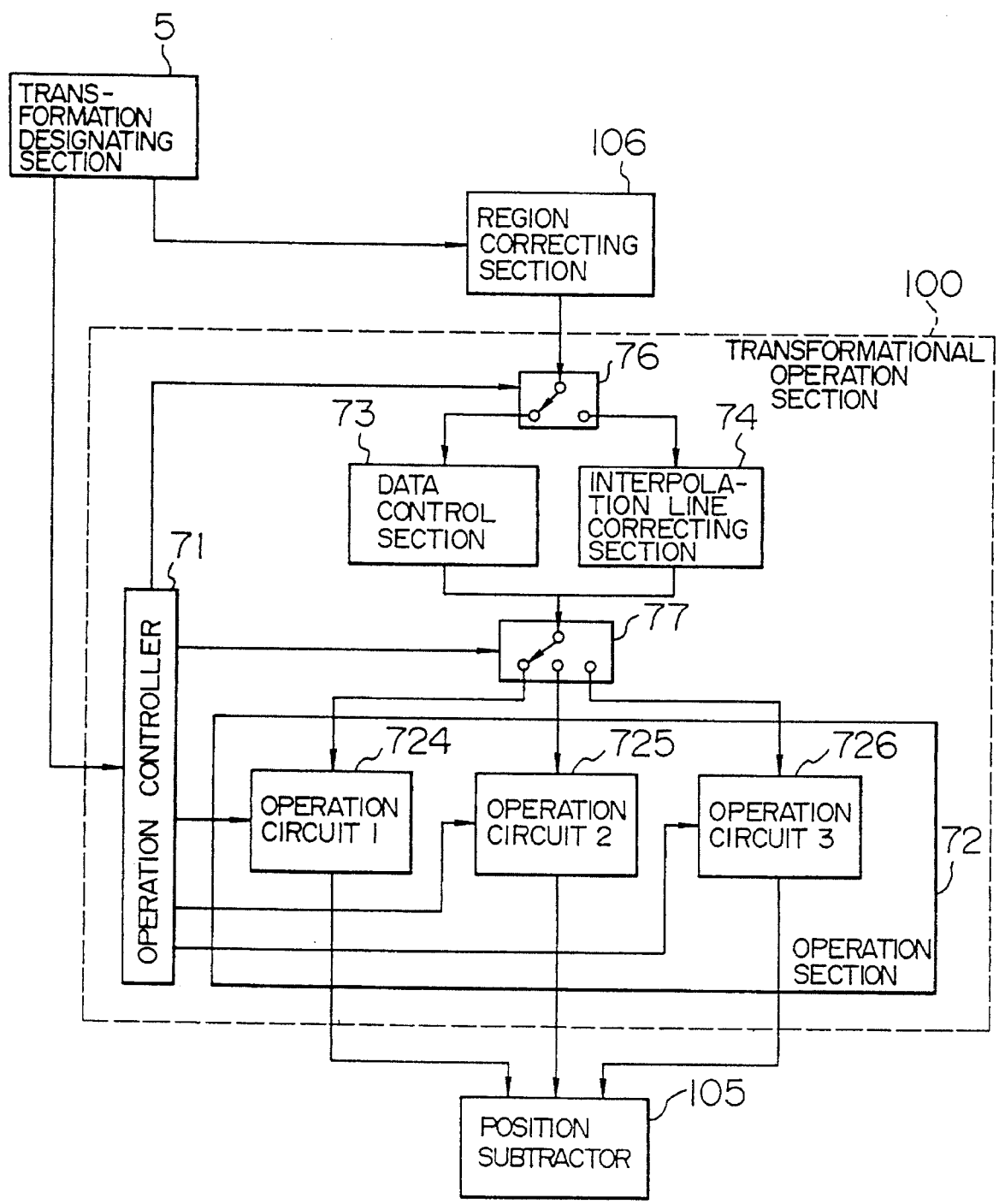
FIG. 37 is a diagram showing a transformational operation section 100 shown in FIG. 28 in detail.

Upon complete correction, each coordinate data is subjected to the transformational operation by the transformational operation section 100. The transformational operation is effected by relocating the coordinate of the outline data in such a manner that a transformation region assumes a shape designated by the transformation designating section 5. The arithmetic operation section of the present system includes three operation circuits 724, 725, 726 as shown in FIG. 37 for effecting transformational operations as expressed by equations ⑦ to ⑨ in FIG. 38, representatively. In FIG. 38, the symbol "·" means "×" representing a product. Among the transformed shapes shown in the menu of FIG. 32A, transformations 1 and 2 are realized by the coordinate relocating operation in accordance with equation ⑦, transformations 3 and 4 by the one in accordance with equation ⑧, and transformations 5 and 6 by the one in accordance with equation ⑨. The operation controller 71 turns the switch 77 in accordance with the operation involved in compliance with an instruction from the transformation designating section 5, and sets a parameter used for arithmetic operation. The data control section 73 prevents code data other than the coordinate points of the outline data from being subjected to arithmetic operation. Also, the interpolation line correcting section 74 is for correcting the linearly-interpolated portions of the outline data to express a curve when preventing the arithmetic operation of the code data and transforming the straight line portions of a pattern into a curve. The characters t and s in the operational equations designate the sizes of a transformation area in the directions of x and y, and character w a transformation degree entered by the transformation designating section 5, which assumes ten stages of value of 0.2, 0.4, 0.6, ... , 2.0 against the transformation degrees of 1 to 10. In the case under consideration, corresponding t and s and the w parameter are set already at the time of selecting a transformed shape by the transformation designating section 5, with the switch 76 turned appropriately. The outline data subjected to the region-related processing is processed into a desired shape by the arithmetic operation at the transformation section 100. After that, the relative position added before transformational processing is subtracted at the position subtractor 105 thereby to restore individual pattern data. The outline data transformed and outputted to the data buffer 8 are developed to a dot data in the display buffer of the development section 9 as in the case of non-transformation, and transferred to the display section 11 for display. The data shown in FIG. 35B, when transformed, is bent at the boundary as shown in FIG. 35C. After all the patterns in the region, that is, the background rectangle, "T", "E", "S", "T" are processed as mentioned above, patterns and characters transformed into the desired shape as shown in FIG. 29B are displayed.

Figure 29C:
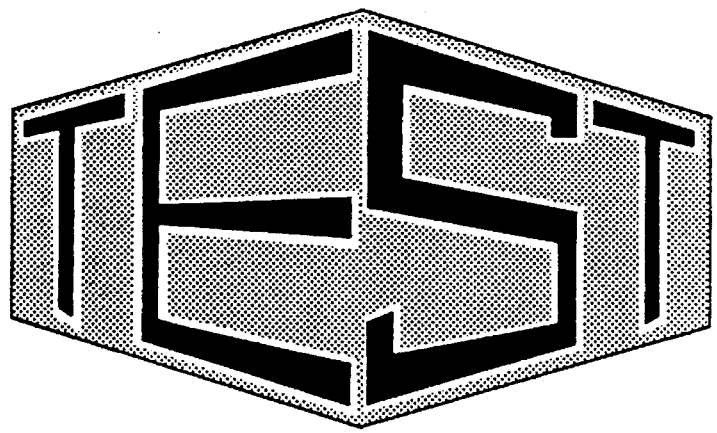
Figure 40A:
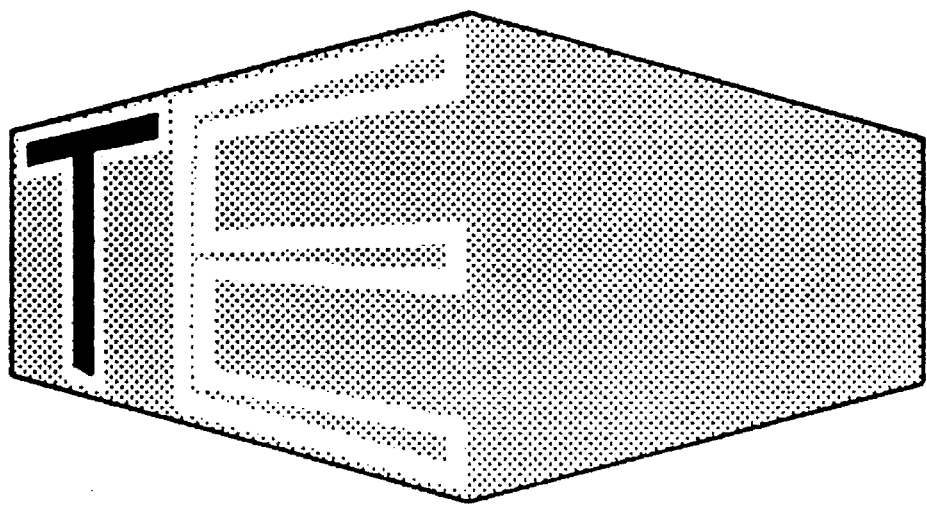
FIGS. 40A and 40B are diagrams for explaining the operation of a rim preparation section 16 shown in FIG. 28.
Figure 40B:
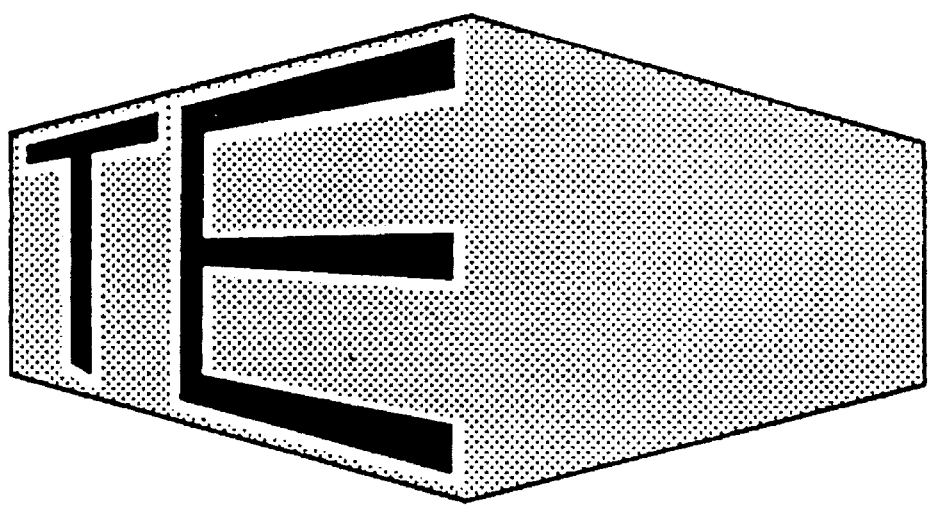

Now, the rim preparation section 16 will be described. The rim preparation section 16 is for preparing and displaying a dot data for rimming a pattern in accordance with the user instruction. The rimming is to form a frame for easily visible display of a character or pattern by surrounding the pattern or character with a color different from the outline data pattern displayed or by displaying in reverse fashion as shown in FIGS. 29C and 40B, in view of the fact that a development and display of an outline data over a figure or another pattern would make a not-easily-visible image as shown, for example, in FIGS. 29A and 29B. The rim preparation section 16, upon instruction for rim display from the user, prepares and displays a dot data of a rim pattern on the display buffer 10 before developing the outline data of the data buffer 8. The rim preparation section 16, like the development section 9, prepares a rim pattern by plotting a curve or straight line for interpolating the coordinate points of the outline data. Unlike the development section 9 which prepares a dot data for display by drawing a contour line of a one-dot thickness and "painting out" the interior, however, the rim preparation section 16 prepares a rim by drawing a thick pattern contour line. More specifically, the rim preparation section 14 stores a matrix of pen tips of different sizes as shown in FIG. 39A, and one of the pen tips is selected in accordance with the size of the pattern to be displayed. As shown in FIG. 39B, a pattern contour line is plotted with the pen tip displaced dot by dot on the display buffer 10, thereby preparing a rim dot data shown in FIG. 39C. The rim dot data is transferred to the display section 11, and displayed in a color different from the pattern as shown in FIG. 40A. Subsequent superposed display of a pattern data developed by the development section 9 makes possible an easily visible display even on a pattern with a figure as shown in FIG. 40B. Also, various shapes of pen tip including circle and rectangle are prepared for rimming for a pattern in character fonts, a rectangular pen tip for a pattern in angular Gothic style, and a round pen tip for a round Gothic style. By thus using various fonts, a properly shaped rim is prepared for each application.

Figure 41:
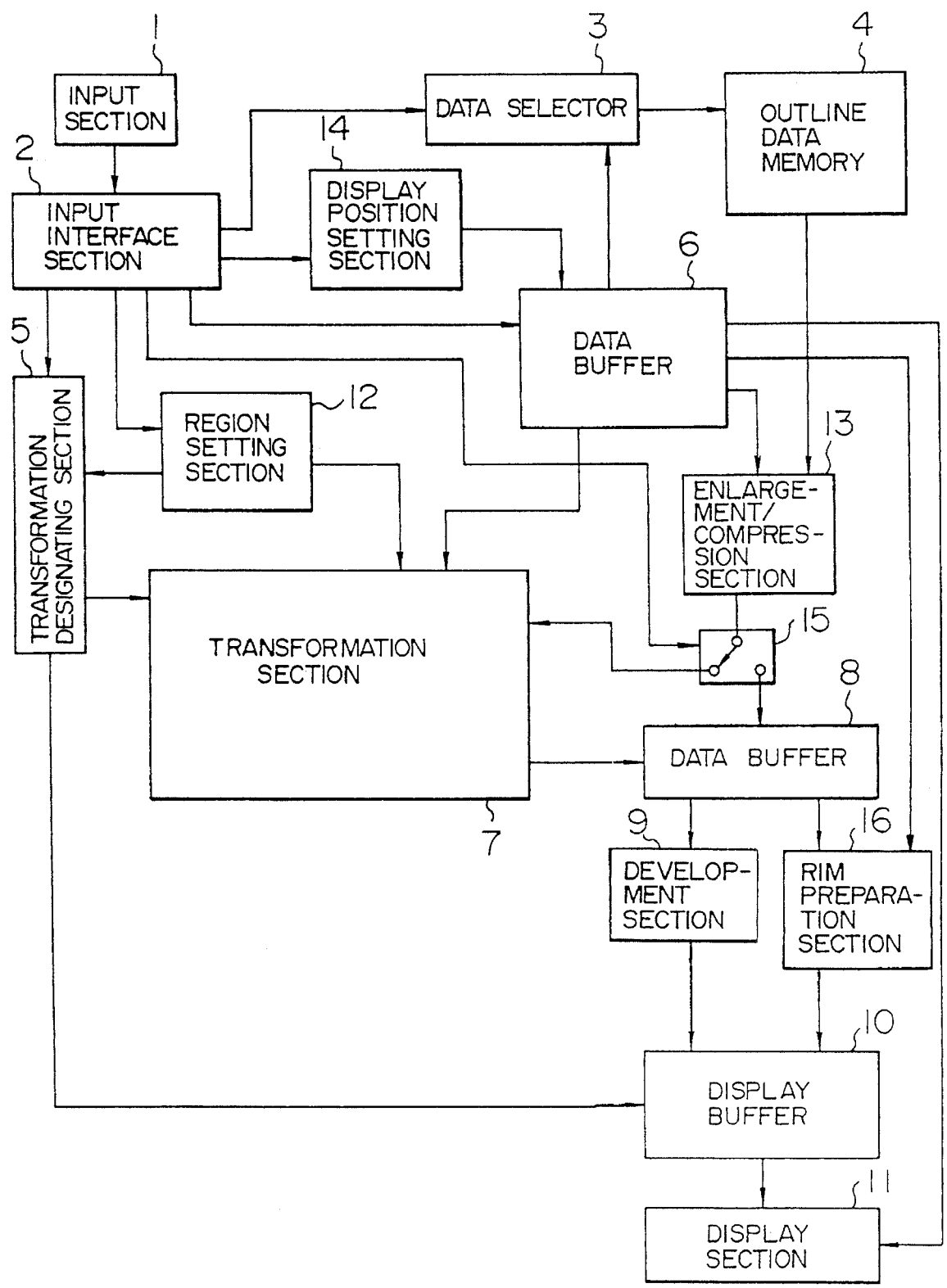
FIG. 41 shows another example of the rim preparation section.
Figure 42A:
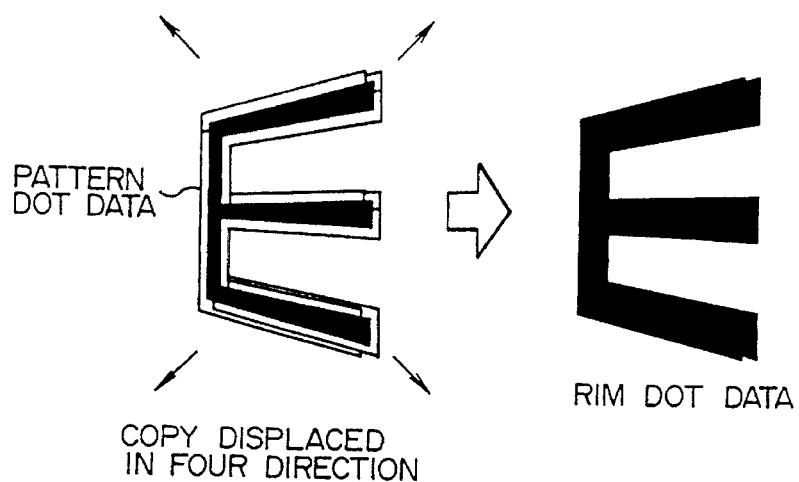
FIGS. 42A, 42B and 42C are diagrams for explaining the operation of the rim preparation section 16 shown in FIG. 15.
Figure 42B:
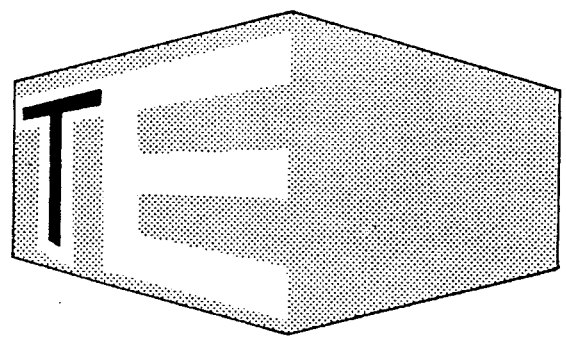
Figure 42C:
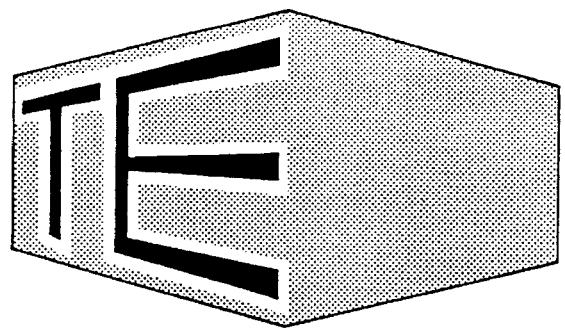

FIG. 41 shows another example of the rim preparation section 16. In this case, a rim is prepared from a dot data after development of an outline data. As shown in FIG. 42A, a developed dot pattern is displayed in a color different from the pattern, displaced in four directions (toward upper right, upper left, lower right and lower left) from the original display position and superposed four times. A rim as shown in FIG. 42B is thus completed. Alternatively, the dot pattern may be displaced in eight directions including up, down, right and left in addition to the above-mentioned four directions and superposed eight times. Plotting and displaying a pattern data thereon, a rimmed pattern is displayed as shown in FIG. 42C. By enlarging or reducing the displaced side, the rim can be widened or narrowed as desired.

The aforementioned rimming process is applicable not only to a case in which a character or pattern is placed on the background image or superposed one on another but also to a case in which a part of document is modified by a half-tone mesh dotting in a documenting machine such as word processor or desk-top publishing system. Also, in the case where a half-tone mesh dotting is applied over a character, the rimmed pattern may be used as a mask pattern for half-tone mesh dotting. More specifically, when a half-tone mesh dotting is displayed, a half-tone mesh figure is prepared with the rimmed pattern portion masked on a bit map memory and displayed over the pattern, thereby completing a rim as shown in FIGS. 29C or 42C.

Having thus described the invention, is now claimed:

1. A character and figure transforming system comprising:

outline data storing means for storing characters and figures in a type of outline data, said outline data defining the characters and figures by coordinate point information representing straight line segments and curve segments constituting contour lines of the characters and figures;

data converting means for converting the characters and figures of said type of outline data into data of a display type;

display means for selectively displaying the characters and figures of said display type;

transformation object designating means for reading outline data of characters and figures which are designated by an external source to be transformed, and for displaying on a display area of said display means after converting the outline data into data of the display type by said data converting means;

transformation region setting means for selecting a transformation region of a given rectangular region on a display area including all the displayed characters and figures designated as objects of transformation;

transformation parameter designating means for selecting a transformed shape of an associated transformation region according to an instruction received from the external source, and for outputting the designated transformed shape as a transformation parameter;

transformation means for performing a transformational operation on the outline data of the characters and figures read out by said transformation object designating means, by using a previously stored operation formula and the transformation parameter outputted from said transformation parameter designating means, and for preparing outline data of the transformed characters and figures; and transformed character display means for converting the outline data of said transformed characters and figures into said display type data by said data converting means and for displaying said converted data of the display type on said display means.

2. A character and figure transformation processing system according to claim 1, further comprising holding means for storing an outline data after transformation;

said transformation means subjecting the coordinate point information of an outline data held by said holding means to a transformational operation pursuant to all the characters and figures in said transformation region.

3. A character and figure transformation processing system according to claim 1, wherein:

said transformation means includes a transformation section for subjecting the coordinate points of an outline data of the characters and figures to a transformational operation for transforming a shape of a coordinate plane constituted on said coordinate points, said transformation section being replaceable with equal effect by a plurality of transformation sections each for performing a transformational operation having an independent transformation effect on the shape of said coordinate plane; and said transformation section includes relative position calculation means for calculating a position of the characters and figures in the transformation region as relative to the transformation region, adder means for adding a calculated relative position to the outline data of the corresponding characters and figures, divider means for dividing the outline data with a relative position added thereto by a size of said transformation region, arithmetic operation means for subjecting the outline data divided by the size of said transformation region to a transformational operation required for attaining a designated transformed shape by at least one type of transformation section, and multiplier means for multiplying the outline data subjected to transformational operation by the size of said transformation region.

4. A character and figure transformation processing system according to claim 3, wherein:

said transformation means comprises a first transformation section for selecting a coordinate plane constituted on the coordinate points of an outline data of the characters and figures to form a mesh pattern, the mesh pattern having a grid and subjecting said coordinate points to such a transformational operation as to form a quadrilateral having four apexes connected in the shape of said mesh pattern, a second transformation section for performing a transformational operation for changing the grid density of said mesh pattern, and a third transformation section for performing a transformational operation for changing the grid line property of said mesh pattern.

5. A character and figure transformation processing system according to claim 1, further comprising display position designating means for setting a display position of a character set and a figure set after transformation in accordance with an instruction from an external source.

6. A character and figure transformation processing system according to claim 5, wherein:

said transformation means includes a transformation section for subjecting the coordinate points of an outline data of said characters and figures to a transformational operation for transforming a shape of a coordinate plane constituted on said coordinate points, said transformation section being replaceable with equal effect by a plurality of transformation sections for performing a transformational operation each having an independent transformation effect on the shape of said coordinate plane; and said transformation section includes relative position calculation means for calculating a position of the characters and figures in the transformation region as relative to said transformation region, adder means for adding a calculated relative position to an outline data of corresponding character and a figure, divider means for dividing an outline data with a relative position added thereto by a size of said transformation region, arithmetic operation means for subjecting the outline data divided by the size of the transformation region to a transformational operation required for attaining said designated transformed shape by use of at least a type of transformation section, and subtracter means for subtracting the calculated relative position from the outline data multiplied by the size of said transformation region.

7. A character and figure transformation processing system according to claim 6, wherein:

said transformation means comprises a first transformation section in which a coordinate plane constituted on the coordinate points of an outline data of the characters and figures is mapped to a gridded mesh pattern, and said coordinate plane is subjected to such a transformational operation as to form a quadrilateral with four apexes thereof forming said mesh pattern, a second transformation section for performing a transformational operation for changing the grid density of said mesh pattern, and a third transformation section for performing a transformational operation for changing the grid line property of said mesh pattern.

8. A character and figure transformation processing system according to claim 1, wherein:

said transformation region setting means sets as a transformation region a minimum rectangle area containing all coordinate points of the characters and figures designated as an object of transformation.

9. A character and figure transformation processing system according to claim 1, wherein:

said transformation parameter designating means includes list display means in which the coordinate plane having constituted thereon coordinate points of an outline data of characters and figures is mapped to a mesh pattern having a grid, and a list of shapes transformed by said transformation means from said mesh patterns is displayed as an example of transformed shapes, said means designating an example of a transformed shape designated selectively from an external source for said transformation region.

10. A character and figure transformation processing system according to claim 1, wherein:

said transformation designating means includes means in which the coordinate plane having constituted thereon the coordinate points of an outline data of characters and figures is mapped to a mesh pattern having a grid, and a transformed shape of said transformation region is designated on the basis of the change in the shape of said mesh pattern and the condition of the grid line thereof.

11. A character and figure transformation processing system according to claim 1, further comprising at least one of a) line segment division correcting means for changing the coordinate point information for generating a line segment constituting a contour line of an outline of an outline data so as to provide an increase thereto, and b) line segment transformation correcting means for changing the coordinate point information for generating a straight line segment to coordinate point information for generating a curve segment, said coordinate point information generating a line segment constituting a contour line of an outline data.

12. A character and figure transformation processing system according to claim 1, further comprising means for displaying a list of figures specified from region shapes after transformation, wherein an example of transformed shape selectively designated, in accordance with an externally generated signal, from said list specifies a transformed shape for said transformation region.

13. A character and figure transforming system comprising:

outline data storing means for storing characters and figures in a type of outline data, said outline data defining the characters and figures by coordinate point information representing straight line segments and curve segments constituting contour lines of the characters and figures;

data converting means for converting the characters and figures of said type of outline data into data of a display type;

display means for displaying the characters and figures of said display type;

transformation object designating means for reading outline data of characters and figures which are designated by an external source to be displayed on said display means, and for displaying on a display area of said display means after converting the outline data into data of the display type by said data converting means, and for selecting characters and figures to be transformed from the displayed characters and figures;

transformation region setting means for selecting as a transformation region a given rectangular region on a display area including all the characters and figures which are read by said transformation object designating means;

transformation parameter designating means for designating a transformed shape of the transformation region in accordance with an instruction from the external source, and for outputting the designated transformed shape as a transformation parameter;

transformation means for performing a transformational operation on the outline data of the characters and figures which are objects to be transformed and which are read out by said transformation object designating means, by using a previously stored operation formula and the transformation parameter outputted from said transformation parameter designating means, and for preparing outline data of the transformed characters and figures; and transformed characters display means for converting the outline data of said transformed characters and figures, said outline data being prepared by said transformation means, into said display type data by said data converting means and for displaying said converted data of the display type on said display means.

14. A character and figure transformation processing system according to claim 13, wherein:

said transformation means includes means for calculating a position of each figure and character in the transformation region as relative to the transformation region, means for adding a relative position thus calculated to an outline data of a figure and a character, and means for subjecting the outline data to a transformational operation with a transformation parameter set as outputted from said transformation designating means thereby to transform a character and a figure.

15. A character and figure transformation processing system according to claim 14, wherein said transformation means includes an operation section for storing a plurality of transformation formula and means for a transformation formula corresponding to a transformed shape designated by said transformation designating means for transformational operation and outputting a parameter for selecting said transformation formula.

16. A character and figure transformation processing system according to claim 14, wherein said transformation means includes means for generating an output corresponding to the size of said rectangle corresponding to a transformation region.

17. A character and figure transformation processing system according to claim 13, wherein said transformation means includes transformational operation means which includes means for transforming a boundary line including a data representative of fold and displacement parameters, and means for adding the coordinates of an intersection between a boundary line and a figure contour line to an outline data of a figure located on the boundary line.

18. A character and figure transforming system comprising:

outline data storing means for storing characters and figures in a type of outline data, said outline data defining the characters and figures by coordinate point information representing straight line segments and curve segments constituting contour lines of the characters and figures;

data converting means for converting the characters and figures of said type of outline data into data of a pixelated form;

said display means displaying the characters and figures of said pixelated form;

transformation object designating means for reading outline data of characters and figures which are designated by an external source to be transformed, and for displaying on a display area of said display means after converting the outline data into data of the pixelated form by said converting means;

transformation region setting means for setting as a transformation region a given region on a display area including all the displayed characters and figures which are objects of transformation;

transformation parameter designating means for designating a transformed shape of the transformation region in accordance with an instruction from the external source, and for outputting the designated transformed shape as a transformation parameter;

transformation means for performing a transformational operation on the outline data of the characters and figures read out by said transformation object designating means, by using a previously stored operation formula and the transformation parameter outputted from said transformation parameter designating means, and for preparing outline data of the transformed characters and figures;

rim preparing means for preparing rim data of the pixelated form to display a frame forming a rim pattern around the characters and figures; and display control means for displaying the rim data prepared by said rim preparing means and for displaying thereon the characters and figures of said pixelated form.

19. A character and figure transformation processing system according to claim 18, further comprising means for displaying said rim pattern in a color different from said characters and figures on said display means.

20. A character and figure transformation processing system according to claim 18, further comprising means for changing the rim width of said rim pattern in accordance with the size of said characters and figures displayed.

21. A method for transforming characters and figures, comprising the steps of:

converting into pixelated form data for displaying on a display means, outline data for defining characters and figures by coordinate point information representing straight line and curve segments constituting a contour line of said characters and figures;

displaying the characters and figures on a display area of the display means;

designating and displaying characters and figures to be transformed as an object of transformation in accordance with an external instruction;

setting as a transformation region an arbitrary region on said display area containing all the characters and figures displayed as said object of transformation;

designating a transformed shape of said transformation region in accordance with an external instruction, and outputting as a transformation parameter the designated transformed shape;

performing a transformation operation on the outline data of the characters and figures designated as the object of transformation, by using a previously stored operation formula and the transformation parameter outputted from said transformation designating means, and preparing outline data of the transformed characters and figures; and converting the outline data of said transformed characters and figures into data of a pixelated form, and displaying said converted data on a display area of said display means.

22. A method for subjecting characters and figures to transformational processing according to claim 21, wherein said step of transformational operation comprises:

a first step of adding positions of all selected characters and figures relative to said transformation region to outline data of all selected characters and figures in said transformation region;

a second step of dividing said outline data by a value representing a size of said transformation region;

a third step of performing the operation for transforming said selected characters and figures corresponding to said outline data into a predetermined shape; and a fourth step of multiplying said outline data by a value representing the size of said transformation region.

23. A method for transforming characters and figures, comprising the steps of:

converting into pixelated form data for displaying on a display means, outline data for defining characters and figures by coordinate point information representing straight line and curve segments constituting a contour line of said characters and figures;

displaying the pixelated form data on a display area of the display means;

selecting characters and figures to be transformed as an object of transformation from displayed characters and figures in accordance with an external instruction;

setting as a transformation region an arbitrary rectangular region on said display area containing all the characters and figures to be transformed;

designating a transformed shape of said transformation region in accordance with an external instruction;

outputting as a transformation parameter the designated transformed shape;

performing a transformation operation on the outline data of the characters and figures designated as the object of transformation, by using a previously stored operation formula and the transformation parameter outputted in the previous step, and preparing outline data of the transformed characters and figures; and converting the outline data of said transformed characters and figures into data of a display form, and displaying said converted data on the display means.

24. A method for subjecting at least one of characters and figures to transformation processing according to claim 23, comprising the steps of:

preparing a pixelated pattern data representative of a rim pattern rimming said selected at least one of characters and figures; and displaying said rim pattern on said display region by said pattern data.

\* \* \* \* \*